(12) United States Patent
Swartz et al.

(10) Patent No.: US 10,939,750 B2
(45) Date of Patent: *Mar. 9, 2021

(54) HEIGHT ADJUSTABLE DEVICE WITH CONCEALED LIFT MECHANISM

(71) Applicant: Ergotron, Inc., St. Paul, MN (US)

(72) Inventors: Nicholas Robert Swartz, Minneapolis, MN (US); Shaun Christopher Lindblad, Inver Grove Heights, MN (US); David James Prince, Saint Paul, MN (US); Michael John Mullen, West Linn, OR (US); James Robert Lucas, Minneapolis, MN (US); Mustafa A. Ergun, Eden Prairie, MN (US); Robert William Fluhrer, Prior Lake, MN (US)

(73) Assignee: Ergotron, Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/737,456

(22) Filed: Jan. 8, 2020

(65) Prior Publication Data
US 2020/0138184 A1     May 7, 2020

Related U.S. Application Data

(63) Continuation of application No. 16/525,189, filed on Jul. 29, 2019, now Pat. No. 10,631,630, which is a
(Continued)

(51) Int. Cl.
*A47B 9/02* (2006.01)
*A47B 21/02* (2006.01)
(Continued)

(52) U.S. Cl.
CPC ............... *A47B 9/02* (2013.01); *A47B 5/04* (2013.01); *A47B 21/02* (2013.01); *A47B 21/06* (2013.01);
(Continued)

(58) Field of Classification Search
CPC .. A47B 9/02; A47B 9/00; A47B 21/02; A47B 21/06; A47B 2021/066; A47B 2200/0046; A47B 2200/01; A47B 2200/12
(Continued)

(56) References Cited

U.S. PATENT DOCUMENTS 4,792,881 A   12/1988   Wilson et al.
5,531,168 A   7/1996    Towfigh
(Continued)

FOREIGN PATENT DOCUMENTS

CA    2905951 A1 *  9/2014  ............. A47B 96/00
CN    203979795 U   12/2014
(Continued)

OTHER PUBLICATIONS

"U.S. Appl. No. 15/576,490, Final Office Action dated Apr. 11, 2019", 6 pgs.
(Continued)

*Primary Examiner* — Jose V Chen
(74) *Attorney, Agent, or Firm* — Schwegman Lundberg & Woessner, P.A.

(57) ABSTRACT

A height adjustable device including a counterbalance mechanism configured to be affixed adjacent to a rear portion of a vertical support member, a worksurface configured to be affixed adjacent to a front portion of the vertical support member, and a mounting member configured to slidably couple the worksurface to the counterbalance mechanism; wherein a portion of the mounting member extends through an opening defined in the vertical support member.

20 Claims, 25 Drawing Sheets

Related U.S. Application Data continuation of application No. 15/576,490, filed as application No. PCT/US2016/029564 on Apr. 27, 2016, now Pat. No. 10,433,638.

(60) Provisional application No. 62/170,321, filed on Jun. 3, 2015, provisional application No. 62/239,028, filed on Oct. 8, 2015, provisional application No. 62/317,031, filed on Apr. 1, 2016.

(51) Int. Cl.

| | | |
|---|---|---|
| *F16M 13/00* | (2006.01) | |
| *F16M 11/22* | (2006.01) | |
| *F16M 11/04* | (2006.01) | |
| *F16M 11/42* | (2006.01) | |
| *A47B 5/04* | (2006.01) | |
| *A47B 21/06* | (2006.01) | |

(52) U.S. Cl.
CPC ........... *F16M 11/046* (2013.01); *F16M 11/22* (2013.01); *F16M 11/42* (2013.01); *F16M 13/00* (2013.01); *A47B 2021/066* (2013.01); *A47B 2200/0046* (2013.01); *A47B 2200/01* (2013.01); *A47B 2200/12* (2013.01); *F16M 2200/047* (2013.01)

(58) Field of Classification Search
USPC .............................. 108/50.01, 50.02, 147, 64
See application file for complete search history.

(56) References Cited

U.S. PATENT DOCUMENTS

| | | | |
|---|---|---|---|
| 5,743,193 | A | 4/1998 | Kakuta et al. |
| 6,135,032 | A | 10/2000 | Ko |
| 6,202,567 | B1 | 3/2001 | Funk et al. |
| 8,065,966 | B1 | 11/2011 | Bacon et al. |
| 8,196,526 | B2 | 6/2012 | Rheault et al. |
| 8,225,724 | B2 | 7/2012 | Obrien |
| 8,662,605 | B2 | 3/2014 | Mcrorie et al. |
| 8,800,454 | B2 | 8/2014 | Jones |
| 9,420,878 | B2 | 8/2016 | Lager |
| 9,723,919 | B1 | 8/2017 | Randolph et al. |
| 9,883,737 | B2 | 2/2018 | Lanphear |
| 9,980,559 | B2 | 5/2018 | Randolph et al. |
| 10,433,638 | B2 * | 10/2019 | Swartz .................... F16M 11/22 |
| 10,631,630 | B2 * | 4/2020 | Swartz ...................... A47B 9/02 |
| 2005/0279033 | A1 | 12/2005 | Faber et al. |
| 2007/0294953 | A1 | 12/2007 | Guillen |
| 2008/0282622 | A1 | 11/2008 | Picchio |
| 2012/0031310 | A1 | 2/2012 | Jedrysik et al. |
| 2014/0312754 | A1 | 10/2014 | Hecht et al. |
| 2015/0176273 | A1 | 6/2015 | Farouk |
| 2015/0295447 | A1 | 10/2015 | Nitz |
| 2015/0354746 | A1 | 12/2015 | Hung |
| 2016/0095433 | A1 | 4/2016 | Cho |
| 2016/0345723 | A1 | 12/2016 | Lanphear |
| 2018/0064243 | A1 | 3/2018 | Keller et al. |
| 2018/0125230 | A1 | 5/2018 | Yamamoto et al. |
| 2018/0168334 | A1 | 6/2018 | Swartz et al. |
| 2018/0295982 | A1 | 10/2018 | Yamamoto |
| 2018/0344024 | A1 | 12/2018 | Kruger et al. |
| 2019/0350357 | A1 | 11/2019 | Swartz et al. |

FOREIGN PATENT DOCUMENTS

| | | | | |
|---|---|---|---|---|
| CN | 107666842 | A | | 2/2018 |
| DE | 4017125 | A1 | | 12/1991 |
| DE | 202009015569 | U1 | | 3/2010 |
| EP | 2946689 | A1 | | 11/2015 |
| EP | 3289922 | A1 * | 3/2018 | ............. A47B 21/02 |
| TW | M486238 | U | | 9/2014 |
| WO | WO-03071898 | A2 | | 9/2003 |
| WO | WO-2008053908 | A1 | | 5/2008 |
| WO | WO-8919264 | | | 12/2014 |
| WO | WO-2016195853 | A1 | | 12/2016 |

OTHER PUBLICATIONS

"U.S. Appl. No. 15/576,490, Non Final Office Action dated Dec. 21, 2018", 8 pgs.
"U.S. Appl. No. 15/576,490, Notice of Allowability dated Jun. 20, 2019", 2 pgs.
"U.S. Appl. No. 15/576,490, Notice of Allowance dated May 28, 2019", 6 pgs.
"U.S. Appl. No. 15/576,490, Response filed May 14, 2019 to Final Office Action dated Apr. 11, 2019", 8 pgs.
"U.S. Appl. No. 15/576,490, Response filed Mar. 19, 2019 to Non Final Office Action dated Dec. 21, 2018", 8 pgs.
"U.S. Appl. No. 16/525,189 Response filed Dec. 2, 2019 to Non-Final Office Action dated Sep. 2, 2019", 8 pgs.
"U.S. Appl. No. 16/525,189, Non Final Office Action dated Sep. 3, 2019", 6 pgs.
"U.S. Appl. No. 16/525,189, Notice of Allowance dated Dec. 18, 2019", 7 pgs.
"U.S. Appl. No. 16/525,189, Preliminary Amendment filed Jul. 30, 2019", 5 pgs.
"Canadian Application Serial No. 2,988,100, Examiner's Rule 30(2) Requisition dated Dec. 4, 2018", 3 pgs
"Canadian Application Serial No. 2,988,100, Office Action dated May 3, 2019", 4 pgs.
"Canadian Application Serial No. 2,988,100, Response filed Nov. 4, 2019 to Office Action dated May 3, 2019", 14 pgs.
"European Application Serial No. 16722746.1, Communication Pursuant to Article 94(3) EPC dated Apr. 25, 2019", 5 pgs.
"European Application Serial No. 16722746.1, Communication Pursuant to Article 94(3) EPC dated Oct. 30, 2019", 4 pgs.
"European Application Serial No. 16722746.1, Communication Pursuant to Article 94(3) EPC dated Nov. 9, 2018", 4 pgs.
"European Application U.S. Appl. No. 16722746.1, Response filed Mar. 19, 2019 to Communication Pursuant to Article 94(3) EPC dated Nov. 9, 2018", 8 pgs
"European Application U.S. Appl. No. 16722746.1, Response filed Jul. 26, 2018 to Communication Pursuant to Rules 161(2) and 162 EPC dated Jan. 23, 2018", 14 pgs.
"European Application U.S. Appl. No. 16722746.1, Response filed Sep. 5, 2019 to Communication Pursuant to Article 94(3) EPC dated Apr. 25, 2019", 7 pgs.
"International Application U.S. Appl. No. PCT/US2016/029564, International Preliminary Report on Patentability dated Dec. 14, 2017", 11 pgs.
"International Application Serial No. PCT/US2016/029564, International Search Report dated Jun. 24, 2016", 6 pgs.
"International Serial No. PCT/US2016/029564, Written Opinion dated Jun. 24, 2016", 9 pgs.
"Tyde", Vitra: XP055505457, [Online] Retrieved from the internet by the examiner on Sep. 7, 2018: <URL: https://www.vitra.com/en-pl/_storage/asset/181144/storage/master/file/3282166/download/Tyde_Fact_EN.pdf>, (Dec. 31, 2013), 12 pgs.
"U.S. Appl. No. 16/525,189, Supplemental Notice of Allowability dated Mar. 26, 2020", 2 pgs.
"Australian Application Serial No. 2016271172, First Examination Report dated Mar. 12, 2020", 3 pgs.
"Australian Application Serial No. 2016271172, Response filed Jun. 9, 2020 to First Examination Report dated Mar. 12, 2020", 73 pgs.
"Canadian Application Serial No. 2,988,100, Office Action dated Jan. 28, 2020", 3 pgs.
"Canadian Application Serial No. 2,988,100, Response filed May 28, 2020 to Office Action dated Jan. 28, 2020", 10 pgs.
"Chinese Application Serial No. 201680032666.2, Office Action dated Sep. 14, 2020", w/ English Translation, 15 pgs.
"Chinese Application Serial No. 201680032666.2, Office Action dated Dec. 27, 2019", w/ English Translation, 17 pgs.

(56) References Cited

OTHER PUBLICATIONS

"Chinese Application Serial No. 201680032666.2, Response filed Jul. 6, 2020 to Office Action dated Dec. 27, 2019", w/ English claims, 8 pgs.
"European Application Serial No. 16722746.1, Communication Pursuant to Article 94(3) EPC dated Jun. 10, 2020", 4 pgs.
"European Application Serial No. 16722746.1, Response filed May 6, 2020 to Communication Pursuant to Article 94(3) EPC dated Oct. 30, 2019", 8 pgs.
"European Application Serial No. 16722746.1, Response filed Oct. 20, 2020 to Communication Pursuant to Article 94(3) EPC dated Jun. 10, 2020", 6 pgs.
"Chinese Application Serial No. 201680032666.2, Response filed Nov. 30, 2020 to Office Action dated Sep. 14, 2020", w/ English claims, 8 pgs.
"European Application Serial No. 16722746.1, Invitation pursuant to Article 94(3) and Rule 71(1) EPC dated Dec. 15, 2020", 5 pgs.

\* cited by examiner

HEIGHT ADJUSTABLE DEVICE WITH CONCEALED LIFT MECHANISM

CLAIM OF PRIORITY

This patent application is a continuation of Ser. No. 16/525,189, titled "HEIGHT ADJUSTABLE DEVICE WITH CONCEALED LIFT MECHANISM," to Swartz et al., filed on Jul. 29, 2019, which is a continuation of Ser. No. 15/576,490, titled "HEIGHT ADJUSTABLE DEVICE WITH CONCEALED LIFT MECHANISM," to Swartz et al., filed on Nov. 22, 2017, which is a U.S. National Stage Filing under 35 U.S.C. § 371 of International Patent Application Serial No. PCT/US2016/029564, titled "HEIGHT ADJUSTABLE DEVICE WITH CONCEALED LIFT MECHANISM," to Swartz et al., filed Apr. 27, 2016, and published on Dec. 8, 2016, as WO 2016/195853 A1, which claims the benefit of priority of U.S. Provisional Patent Application Ser. No. 62/170,321, titled "HEIGHT ADJUSTABLE DEVICE WITH CONCEALED LIFT MECHANISM," to Swartz et al., filed on Jun. 3, 2015; this patent application claims the benefit of priority of U.S. Provisional Patent Application Ser. No. 62/239,028, titled "HEIGHT ADJUSTABLE DEVICE WITH CONCEALED LIFT MECHANISM," to Swartz et al., filed on Oct. 8, 2015; this patent application claims the benefit of priority of U.S. Provisional Patent Application Ser. No. 62/317,031, to Prince et al., titled "PORTABLE AND RECONFIGURABLE WORKSTATION ASSEMBLY," filed on Apr. 1, 2016; the benefit of priority of each of which is claimed hereby, and each of which are incorporated by reference herein in its entirety.

FIELD

The disclosure generally relates to systems and methods for height adjustable desks.

BACKGROUND

Height adjustable worksurfaces and workstations can be used in sit-to-stand applications.

Overview

The present inventors recognized a need for a height adjustable device having a counterbalance mechanism or lifting mechanism with a thin width profile. The thin width profile of the counterbalance mechanism can allow a substantial portion of the device to be mounted within a wall or concealed behind a panel. Such a mounting can reduce the space required in a room or hallway where the height adjustable device can be used. This can be advantageous for installations of work-stations/display mounts in areas with minimum clearances (hospital hallways, operating or patient rooms, cruise ships, efficiency apartments, etc.). Concealing the lift mechanism/counterbalance mechanism also can create a cleaner visual appearance by concealment of the device.

The height adjustable device can include a counterbalance mechanism (also referred to as a lift mechanism in this disclosure) and a mounting member. The mounting member can be slidably coupled to the counterbalance mechanism to provide for a range of positions from a lowered position to a raised position. The counterbalance mechanism can include an energy storage member that can support the weight of items attached to the mounting member, for example, a worksurface and/or display mount and display. The energy storage member can support the worksurface (e.g. with a computer on it) and allow a user to adjust the worksurface height with minimal effort. The counterbalance mechanism can be positioned on the inside of a wall surface, and can be configured to be concealed in a wall structure, such as a standard wall having a 3.5" depth or a thinner wall having a smaller depth, such as less than 3.5". The mounting member can protrude through the wall surface, into a room area.

A worksurface, such as a desk or table surface, can be coupled to the mounting member. The worksurface can provide space for a computer, a computer keyboard, documents, or provide any other desk/table functions. In some example implementations, a hinge in back of the worksurface can allow the worksurface to be folded when not in use.

A display mounting assembly can be directly attached to the mounting member or can be attached to the worksurface. The display mounting assembly can be configured to hold one or more displays and can include display adjustment features. The display mounting assembly can include a mounting column that can also include a second counterbalance mechanism for providing height adjustability of the display mount.

The height adjustable device can be configured with a worksurface, with a display mount, or with both a worksurface and a display mount.

The height adjustable device can include a panel that can cover an opening in a wall formed for the placement of the counterbalance mechanism. The panel can include one or more slots. The mounting members can extend from the counterbalance mechanism, through the slots and can protrude from the exterior side of the panel, into a room area. The panel can be removable for maintenance or adjustment of the counterbalance mechanism, or for installation purposes.

The counterbalance mechanism can include attachment members that can attach to an inner wall structure, such as to wall studs. The attachment members can be substantially perpendicular to a substantially vertical counterbalance mechanism. In addition, the present inventors recognized a need for a self-contained, collapsible, freestanding, mobile, double-sided, sit/stand workstation assembly. Examples of this workstation assembly can be used as a standalone workstation, or several workstations can be linked together to form a collaborative workspace. The workstation assembly can have various sizes, single-sided, dual-sided, 1, 2, or 4 independent worksurfaces.

Examples of this workstation assembly can be a piece of furniture that can easily be converted from a compact, self-contained, highly mobile unit to an expanded, highly functional, height adjustable work space. This concept can be scaled from having a single stowed worksurface to any number of worksurfaces, for example, two, four, six or eight worksurfaces.

Deployment of legs of an example workstation assembly can be executed any number of ways, and in examples described below, legs are deployed in a horizontally and vertically rotating manner. The workstation assembly can include built in handles to aid in the movement of the unit, which can also include casters mounted to the underside. In an example, the workstation assembly can also include casters mounted at the end of each leg to enable movement of the workstation assembly after the legs are deployed.

The workstation assembly can also include accessory channels on the left, top, and right sides, which can be used for attaching privacy/distraction management panels, power systems, storage, accessory hooks, etc. In an example the accessory channels can also be used as a means of attaching adjacent workstation assembly units together, if desired. In an example, the legs can be deployed prior to deploying the worksurfaces. Such a deployment can prevent improper loading of a worksurface that is unsupported by a sufficiently sized base. As described below the legs can overlap the worksurface on the left and right sides.

A workstation assembly can include a shallow depth of a lifting mechanism. This shallow depth can allow a substantial portion of the lifting mechanism to be mounted within a wall or concealed behind a panel. Such space saving/concealment reduces the space required in the room or hallway where the workstation assembly can be used. This can be beneficial for installations of workstation assemblies in areas requiring minimum clearances (hospital hallways, operating or patient rooms, cruise ships, efficiency apartments, etc.). Concealing at least a portion of the lift mechanism can also create a cleaner visual appearance of the workstation assembly.

Workstation assemblies can include a wheeled base. This can allow them to be moved around and create workspace for more than one person. The panels of the workstation assembly can also perform as a privacy panel.

To further illustrate the HEIGHT ADJUSTABLE DEVICE WITH CONCEALED LIFT MECHANISM disclosed herein, a non-limiting list of examples is provided here:

In Example 1, a height adjustable device can comprise a counterbalance mechanism configured to be affixed adjacent to a rear portion of a vertical support member; a worksurface configured to be affixed adjacent to a front portion of the vertical support member; and a mounting member configured to slidably couple the worksurface to the counterbalance mechanism, wherein a portion of the mounting member extends through an opening defined in the vertical support member.

In Example 2, the height adjustable device of Example 1 can optionally be configured such that the vertical support member includes a first vertical structural member and a second vertical structural member.

In Example 3, the height adjustable device of any one or any combination of Examples 1-2 can optionally be configured such that the counterbalance mechanism includes a first attachment member affixed to the first vertical structural member and a second vertical structural member.

In Example 4, the height adjustable device of Example 3 can optionally be configured such that the counterbalance mechanism includes a second attachment member affixed to the first vertical structural member and the second vertical structural member.

In Example 5, the height adjustable device of any one or any combination of Examples 1-4 can optionally be configured to further comprise a display mount assembly configured to couple to the mounting member, the display mount assembly configured to support at least one electronic display.

In Example 6, the height adjustable device of any one or any combination of Examples 1-5 can optionally be configured such that the worksurface is configured to pivot between a folded position and a working position.

In Example 7, the height adjustable device of any one or any combination of Examples 1-6 can optionally be configured such that the vertical support member includes a removable panel, the removable panel defining the opening.

In Example 8, the height adjustable device of any one or any combination of Examples 1-7 can optionally be configured such that the vertical support member is configured to be included in at least a portion of a wall.

In Example 9, a height adjustable device can comprise a base; a vertical support member configured to be coupled to the base; a first panel configured to be coupled to one of the base and the vertical support member, the first panel having a first panel surface and a second panel surface opposing the first panel surface; a first counterbalance mechanism configured to be affixed adjacent to the second panel surface; and a first mounting member configured to be affixed adjacent to the first panel surface and slidably coupled to the first counterbalance mechanism.

In Example 10, the height adjustable device of Example 9 can optionally be configured to further comprise a second panel coupled to one of the base and the vertical support member, the second panel having a third panel surface and a fourth panel surface opposing the third panel surface, wherein the third panel surface opposes the first panel surface; a second counterbalance mechanism configured to be located affixed adjacent to the fourth panel surface; and a second mounting member configured to be affixed adjacent to the third panel surface and slidably coupled to the second counterbalance mechanism.

In Example 11, the height adjustable device of Example 10 can optionally be configured such that the first and second mounting members are independently adjustable.

In Example 12, the height adjustable device of any one or any combination of Examples 10-11 can optionally be configured to include a first worksurface coupled to the first mounting member wherein a first long axis of the first panel is configured to be both generally parallel to a first user's viewing axis and generally perpendicular to a first user's viewing axis and including a second worksurface wherein a second long the second panel is configured to be both generally parallel to a second user's viewing axis and generally perpendicular to a second user's viewing axis.

In Example 13, the height adjustable device of any one or any combination of Examples 9-11 can optionally be configured to further comprise a worksurface coupled to the first mounting member.

In Example 14, the height adjustable device of Example 13 can optionally be configured such that the worksurface can be positioned in a folded position and a working position.

In Example 15, the height adjustable device of any one or any combination of Examples 9-14 can optionally be configured such that the first panel is configured to be generally perpendicular to a user's viewing axis.

In Example 16, the height adjustable device of any one or any combination of Examples 9-14 can optionally be configured such that the first panel is configured to be generally parallel to a user's viewing axis.

In Example 17, the height adjustable device of any one or any combination of Examples 9-16 can optionally be configured such that the first and second counterbalancing mechanisms are affixed to the vertical support member.

In Example 18, a workstation assembly can comprise a supporting member, the supporting member including at least one of a panel and a base; a first lift mechanism coupled to the supporting member; a second lift mechanism coupled to the supporting member; a first worksurface coupled to the first lift mechanism, wherein the first lift mechanism is configured to raise and lower the first worksurface; and a second worksurface coupled to the second lift mechanism, wherein the second lift mechanism is configured to raise and lower the second worksurface.

In Example 19, the workstation assembly of Example 18 can optionally be configured to further comprise a third lift mechanism coupled to the supporting member and a third worksurface coupled to the third lift mechanism, wherein the third lift mechanism is configured to raise and lower the third worksurface.

In Example 20, the workstation assembly of Example 19 can optionally be configured to further comprise a fourth lift mechanism coupled to the supporting member and a fourth worksurface coupled to the fourth lift mechanism, wherein the fourth lift mechanism is configured to raise and lower the fourth worksurface.

In Example 21, a workstation assembly can comprise a supporting member, the supporting member including a panel member, the panel member having a first exterior surface and a second exterior surface opposing the first exterior surface; a first lift mechanism coupled to the supporting member and extending outwardly from the first exterior surface; a second lift mechanism coupled to the supporting member and extending outwardly from one of the first exterior surface and the second exterior surface a first worksurface coupled to the first lift mechanism, wherein the first lift mechanism is configured to raise and lower the first worksurface; and a second worksurface coupled to the second lift mechanism, wherein the second lift mechanism is configured to raise and lower the second worksurface.

In Example 22, the workstation assembly of Example 21 can optionally be configured to further comprise a first privacy panel configured to block at least one of sound, light, or vision adjacent to the first work surface.

In Example 23, the workstation assembly of Example 22 can optionally be configured such that the first privacy panel is moveable between a forward position and a rearward position.

In Example 24, the workstation assembly of Example 22 can optionally be configured such that the first privacy panel is coupled to the first lift mechanism so that when the first worksurface is raised or lowered, the privacy panel is raised or lowered.

In Example 25, the workstation assembly of Example 24 can optionally be configured such that the first privacy panel includes an independent height adjustment mechanism.

In Example 26 height adjustable device or workstation assembly of any one or any combination of Examples 1-25 can optionally be configured such that all elements, operations, or other options recited are available to use or select from.

These and other examples and features of the present height adjustable device and lift mechanisms will be set forth in part in the following Detailed Description. This Overview is intended to provide non-limiting examples of the present subject matter it is not intended to provide an exclusive or exhaustive explanation. The Detailed Description below is included to provide further information about the present height adjustable device and lift mechanisms.

BRIEF DESCRIPTION OF THE DRAWINGS

The exemplifications set out herein illustrate exemplary examples of the invention, and such exemplifications are not to be construed as limiting the scope of the invention in any manner.

The drawings illustrate generally, by way of example, but not by way of limitation, various examples discussed in the present document.

The scope of the invention should be determined with reference to the appended claims, along with the full scope of equivalents to which such claims are entitled.

DETAILED DESCRIPTION

Figure 1:
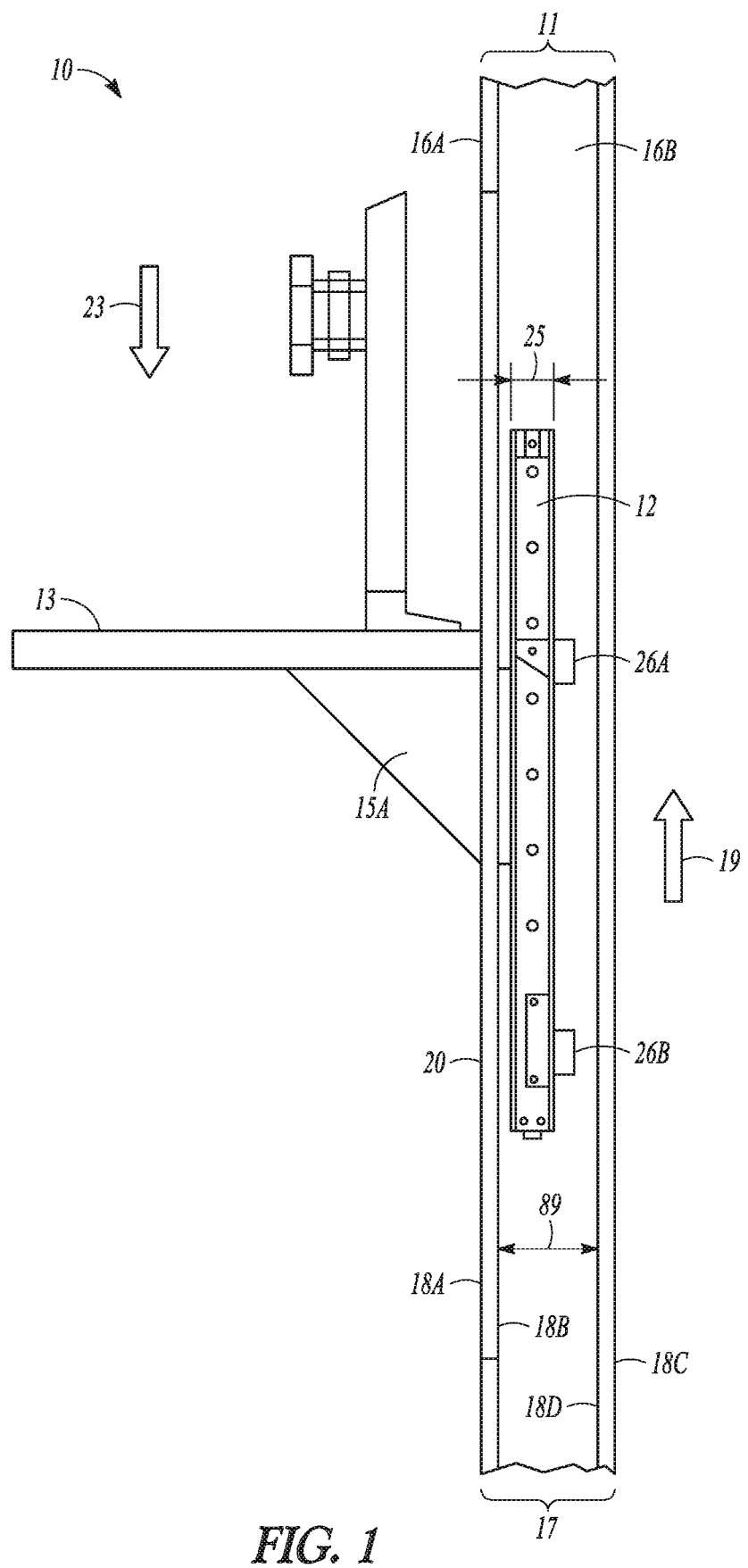
FIG. 1 illustrates a side view of a height adjustable device, in accordance with at least one example of the present disclosure.
Figure 2:
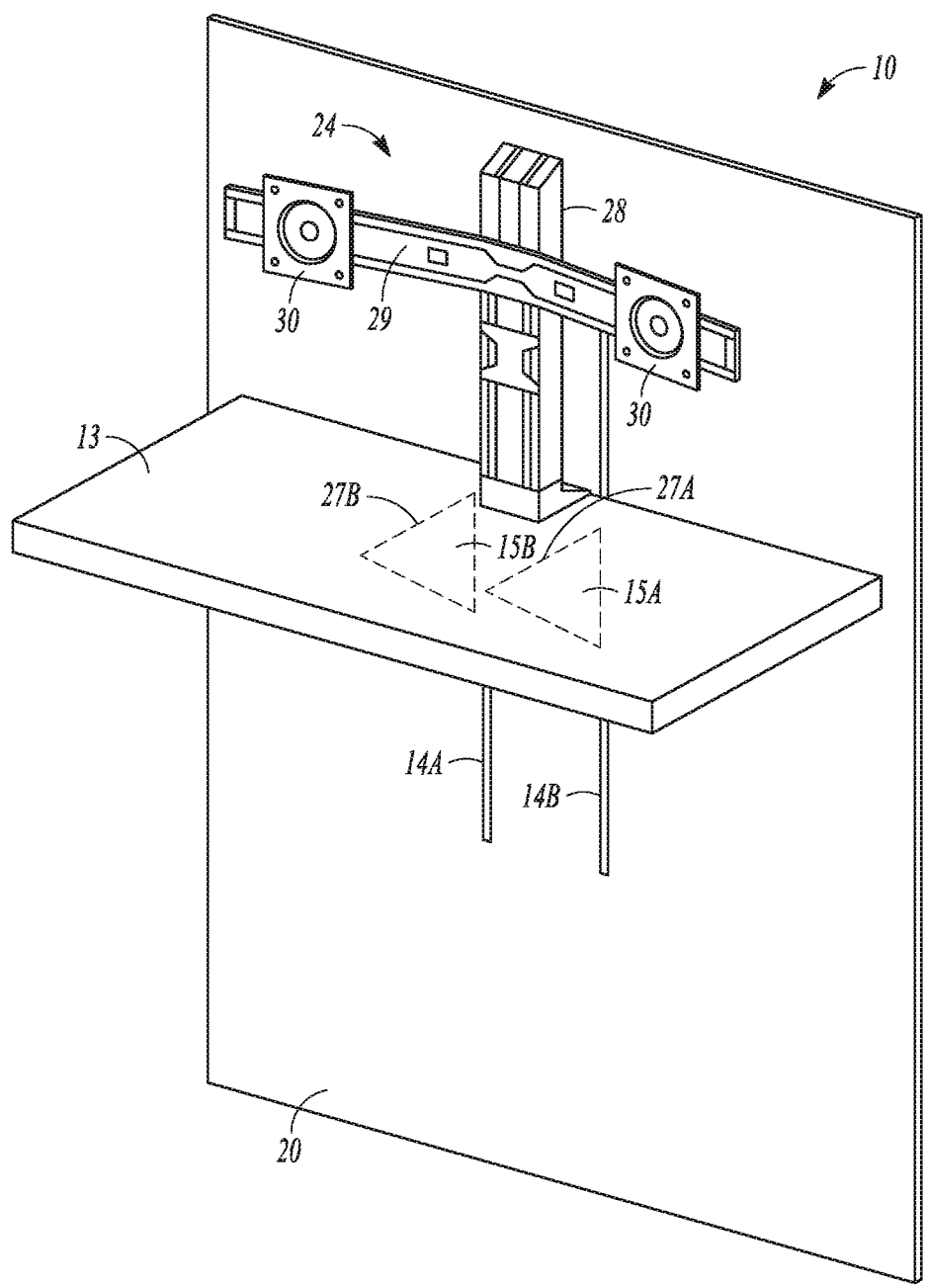
FIG. 2 illustrates a front perspective view of a height adjustable device, in accordance with at least one example of the present disclosure.

FIG. 1 illustrates a side view of a height adjustable device 10, in accordance with at least one example of the present disclosure. FIG. 2 illustrates a front perspective view of a height adjustable device 10, in accordance with at least one example of the present disclosure. The height adjustable device 10 can include a vertical support member 11, a counterbalance mechanism 12, a worksurface 13, a first opening 14A, a second opening 14B, a first mounting member 15A, and a second mounting member 15B (see FIG. 2).

The vertical support member 11 can include a front portion 16A and a rear portion 16B. The rear portion 16B can oppose the front portion 16A. In an example, the front and rear portions can be two opposing faces or main surfaces of a panel or wall. The vertical support member 11 can be a portion of a wall 17. In another example, the vertical support member 11 can include a panel 20, that can be coupled to or be a portion of the wall 17. In another example, the panel 20 can be part of a free standing device not associated with a wall 17.

In an example, a wall 17 can include an opening (not shown) such that the panel 20 can fit the opening and form a portion of the wall 17. In an example, the panel 20, wall 17, or vertical support member 11, can include a first vertical surface 18A, and an opposing second vertical surface 18B. In an example, a second panel 20B can include a third vertical surface 18C, and an opposing fourth vertical surface 18D and as described below can include corresponding counterbalance mechanisms and/or worksurfaces.

The counterbalance mechanism 12 can be affixed adjacent to the rear portion 16B of the vertical support member 11. In an example, the counterbalance mechanism 12 can be affixed adjacent to the second vertical surface 18B or other structural members of the vertical support member 11. The first and second openings 14A, 14B are shown in FIG. 2 and can be vertically oriented slots that can allow the first and second mounting members 15A, 15B to extend through the vertical support member 11. The portion of the first and second mounting members 15A, 15B that extends to the rear portion 16B (FIG. 1), can be coupled to the counterbalance mechanism 12. The portion of the first and second mounting members 15A, 15B that extends to the front portion 16A can support the worksurface 13. The first and second mounting members 15A, 15B can be moveable along a portion of the length of the counterbalance mechanism 12.

Although the height adjustable device 10 is shown in FIG. 2 as having first and second openings 14A, 14B, and first and second mounting members 15A, 15A, any number of openings or mounting members can be used without changing the intent of the present disclosure. In an example one opening and one mounting member are used. In an example, more than two openings and more than two mounting members are used. In an example, the first and second mounting members 15A, 15B can be connected with a structural member or formed as one piece.

The counterbalance mechanism 12 can include an energy storage member such as a spring, a gas spring, or a resilient member that can provide a counteracting force 19 (FIG. 1) to any downward force 23 (FIG. 1) caused by the weight of the worksurface 13, a display mounting assembly 24, the first and second mounting member 15A, 15B, or any additional weight applied to the worksurface 13, such as a computer, books, etc., or the weight of any displays attached to the display mounting assembly 24.

The counterbalance mechanism 12 can be adjustable to tailor the counteracting force 19 to apply to various configurations that can be used, and the counteracting force 19 can also provide a force to make raising the height adjustable device 10 easier. Any height adjustment of the worksurface 13 can be made with a minimal user effort. The counterbalance mechanism 12 can include wheels, pulleys, and tension members. The tension members can be ropes, cords, chains or cables.

The counterbalance mechanism 12 can be configured with a thin width profile 25 (FIG. 1) such that the counterbalance mechanism 12 can be located within a wall 17 (see also FIG. 3), The thin width profile 25 can be in the range of about 1-6 inches. The thin width profile 25 can be in the range of about 2-5 inches. The thin width profile 25 can be in the range of about 3-4 inches. The thin width profile 25 can be in the range of about 3.5 inches.

The counterbalance mechanism 12 can be adjustable from either side of the panel 20. A wall structural member (e.g. wood or metal stud) width 89 can be greater than the thin width profile 25 or any combined width of the counterbalance mechanism 12 and the width of attachment members 26A, 26B that may be coupled to the counterbalance mechanism 12. In an example, the width of the counterbalance mechanism 12 and any auxiliary attachment structures can be narrow enough such that the counterbalance mechanism 12 can be hidden within a wall 17 or panel 20 structure.

The worksurface 13 can be coupled to or can rest against an upper surface 27A, 27B of the mounting member 15A, 15B. The worksurface 13 can be any size. Worksurfaces 13 that are larger can be supported by more than one counterbalance mechanism. Height adjustable devices 10 having more than one counterbalance mechanism connected to a worksurface 13, and each having at least one mounting member can be synchronized to raise and lower evenly.

The display mounting assembly 24 can include a column 28, a cross member 29, and one or more display mounts 30. The display mounting assembly 24 can be coupled to the worksurface 13. The display mount 30 can be configured to retain a video display, such as a VESA mount. The display mounting assembly 24 can include a cross member 29 that can allow more than one display mount 30 to be used. The display mounts 30 can be movably coupled to the cross member 29. A display (not pictured) can be coupled to the display mount 30. The column 28 can include a separate adjustable counterbalance mechanism, to allow a height adjustment of the display mount 30 relative to a top of the worksurface 13. In an alternative example, the display mounting assembly 24 can be coupled to the mounting member 15A, 15B.

The first and second openings 14A, 14B can be a slot, an open track, a free space between two components, or any other type of aperture that can allow one or more mounting members to extend from one side of a wall or panel surface to the other side of the wall or panel surface. The first and second openings 14A, 14B can extend vertically in the panel 20. The first and second openings 14A, 14B can allow the mounting members 15A, 15B (see FIG. 1) to slide upwardly and downwardly so that the height of the height adjustable device 10 can be changed.

In an example, the mounting members 15A, 15B can be formed as shown with a triangular shaped configuration. In an alternative example, the mounting members 15A, 15B can be rectangularly shaped, irregularly shaped, or have curved portions. In an example, the panel 20 can include only a first opening 14A. In an example, the panel 20 can include more than two slots. In an alternative example, openings, such as the first and second openings 14A, 14B can be cut into existing wall structure materials, such as drywall, paneling, or composite materials and the panel 20 need not be part of the height adjustable device 10.

Figure 3:
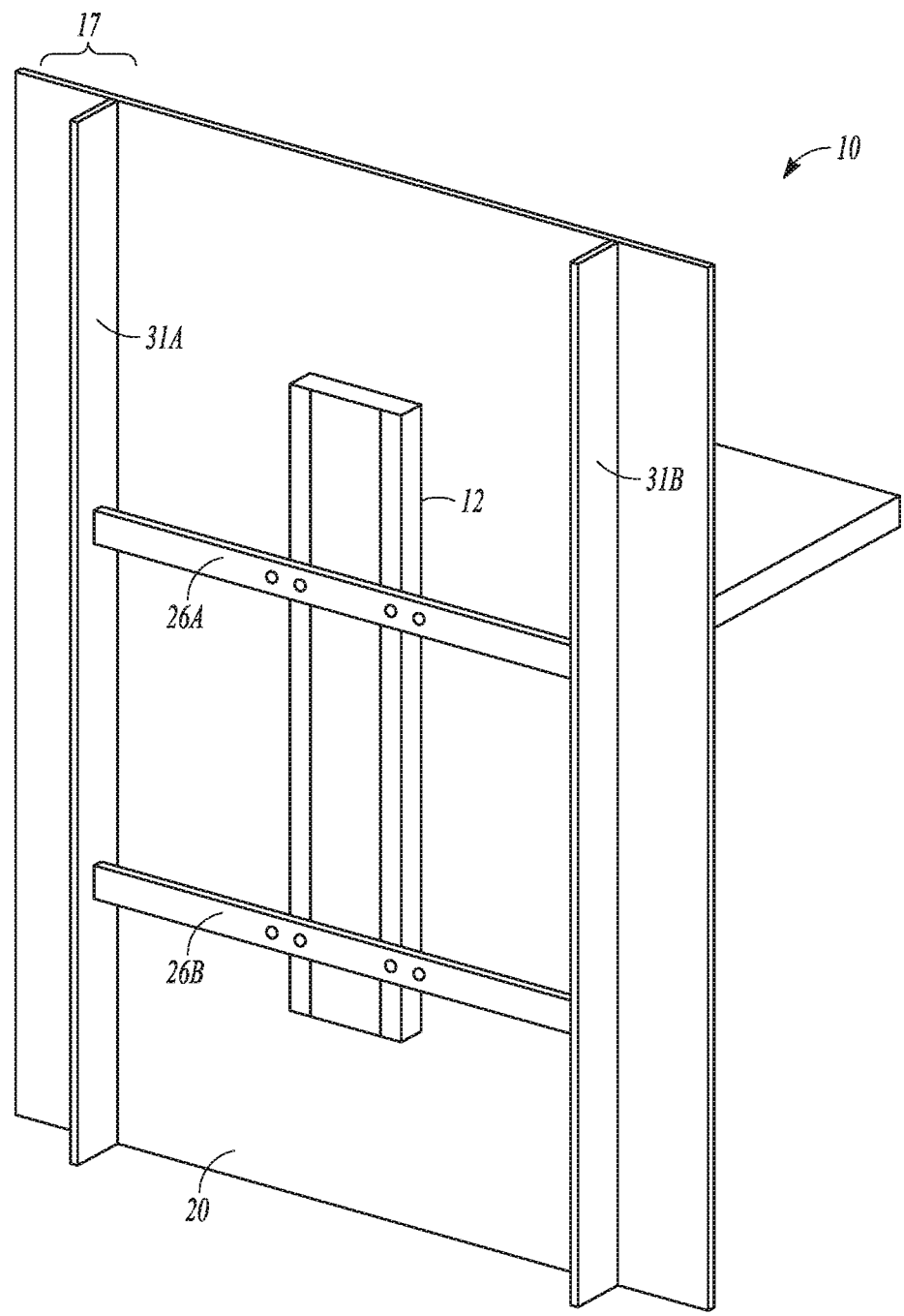
FIG. 3 illustrates a rear perspective view of a height adjustable device, in accordance with at least one example of the present disclosure.

FIG. 3 illustrates a rear perspective view of a height adjustable device 10, in accordance with at least one example of the present disclosure. The counterbalance mechanism 12 can be located between wall structure members such as between a first vertical member 31A and a second vertical member 31B. The first and second vertical members 31A, 31B, can be wood, composite, plastic, or metal. The first and second vertical members 31A, 31B can be wall structural members such as studs, or vertical structural members of a free standing unit.

The height adjustable device 10 can include attachment configurations to attach the counterbalance mechanism 12 to one or more vertical members. In another example, the counterbalance mechanism 12 can be directly attached to a panel 20 or to non-vertical members, such as horizontal structural members. In an example, the height adjustable device 10 can include first and second attachment members 26A, 26B that can be coupled to the counterbalance mechanism 12, and to the first and second vertical members 31A, 31B.

The first and second attachment members 26A, 26B can securely retain the counterbalance mechanism 12 to a wall 17 that the counterbalance mechanism 12 can support the weight of the mounting members, worksurface and items supported by the worksurface (see FIGS. 1-2). Although the first and second attachment members 26A, 26B are shown as separate horizontal members, any means of attaching the counterbalance mechanism 12 to the first and second vertical members 31A, 31B can be used such as integral brackets, clamps, bolts, screws. In an example, the counterbalance mechanism 12 can be attached to a first vertical member 31A and not necessarily centered between two wall members as shown.

Figure 4B:
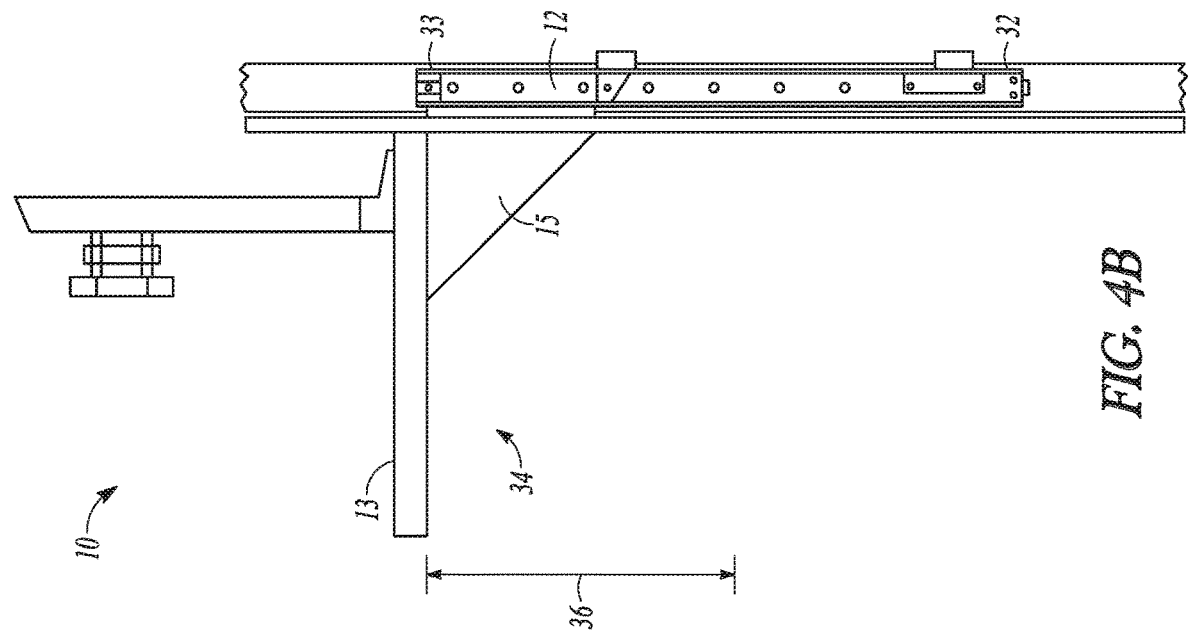
FIGS. 4A-B illustrates a side view of a height adjustable device with a worksurface in upper and lower positions, in accordance with at least one example of the present disclosure.
Figure 4A:
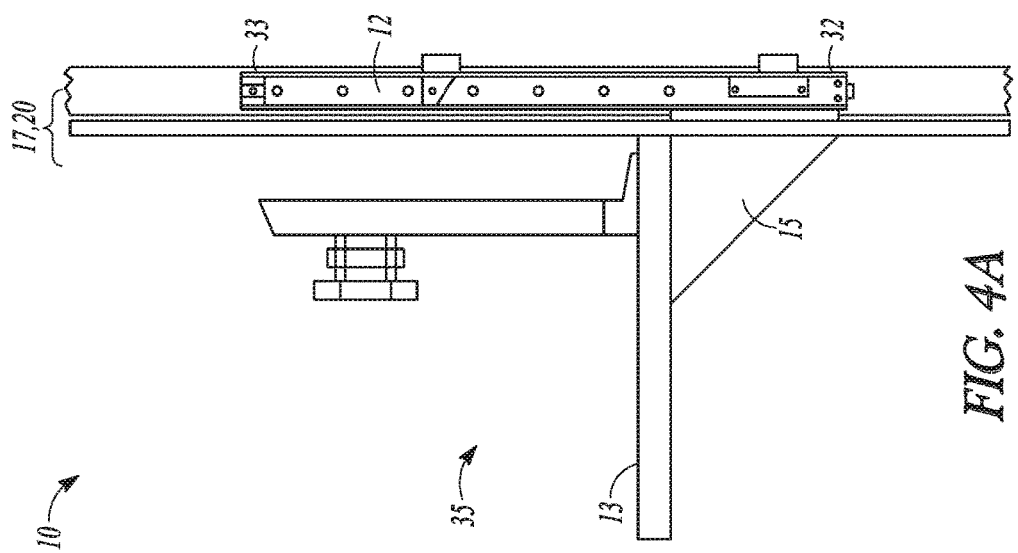

FIGS. 4A-B illustrate a side view of a height adjustable device 10 with a worksurface 13 in upper and lower positions, in accordance with at least one example of the present disclosure. The counterbalance mechanism 12 can be firmly attached to an inner wall or panel structure, while a mounting member 15 is free to slide upwardly and downwardly in the openings 14A, 14B (see FIG. 2). The height adjustable device 10 can include a lower position 35, where the mounting member 15 can be located near a lower end 32 of the counterbalance mechanism 12. The height adjustable device 10 can include an upper position 34, where the mounting member 15 can be located near an upper end 33 of the counterbalance mechanism 12. Movement between these positions can accommodate for varied heights of users and also accommodate for sit/stand applications. The length of the counterbalance mechanism 12 can be formed to allow a desired length of travel of a height adjustment dimension 36 for the mounting member 15 (or worksurface 13) from the lower position 35 to the upper position 34.

Figure 5B:
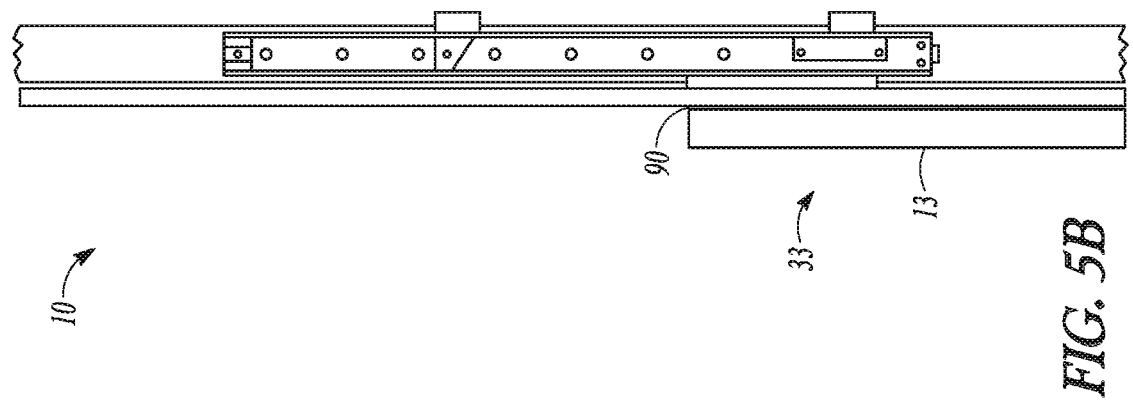
FIGS. 5A-B illustrates a side view of a height adjustable device with the worksurface in working position and a folded position, in accordance with at least one example of the present disclosure.
Figure 5A:
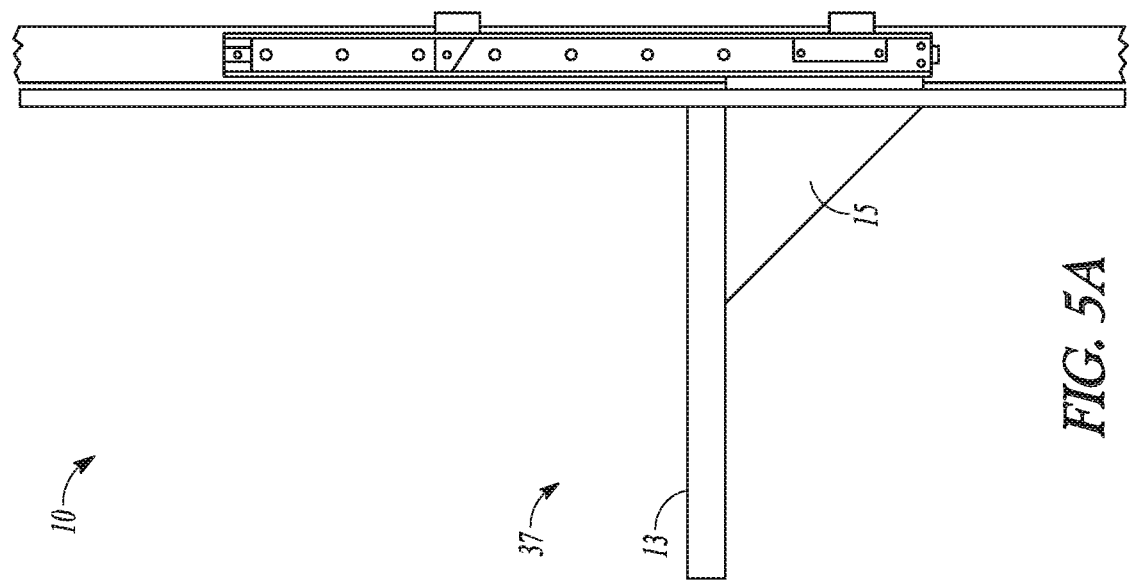

FIGS. 5A-B illustrate a side view of a height adjustable device 10 with the worksurface 13 in working position 37 (e.g. deployed) and a folded position 38 (e.g. stowed), in accordance with at least one example of the present disclosure. The mounting member 15 can be foldable, collapsible, or include removable portions. The worksurface 13 can include a hinged attachment 90 to a portion of the mounting member 15, such that when the mounting member 15 is folded, collapsed, or a portion removed, the worksurface 13 can be placed in the folded position 38. The folded position 38 can provide space savings in congested areas, such as hallways.

Figure 6:
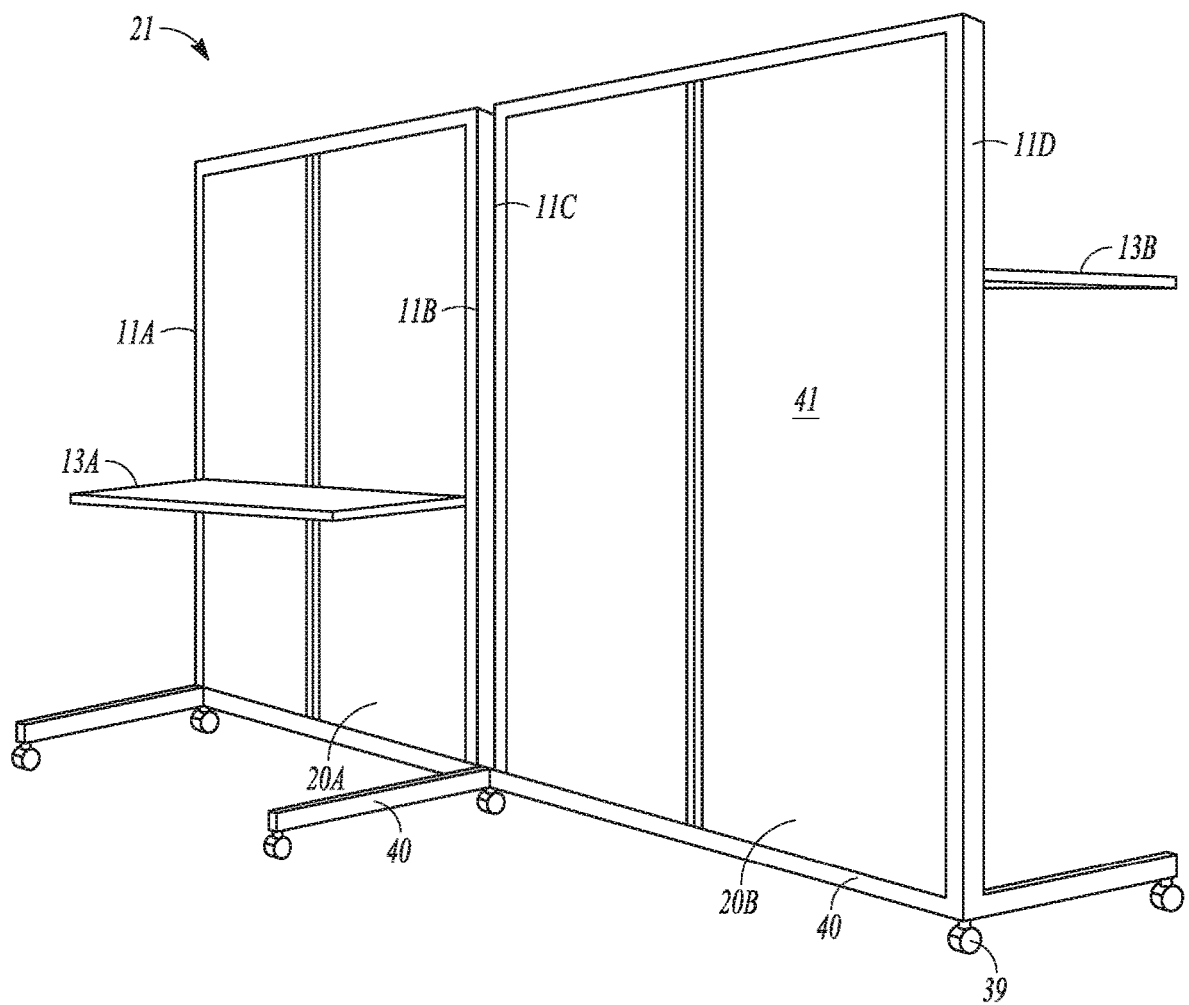
FIG. 6 illustrates a perspective view of a height adjustable device located on a base with casters, in accordance with at least one example of the present disclosure.

FIG. 6 illustrates a perspective view of a height adjustable device located on a base with casters, in accordance with at least one example of the present disclosure. The height adjustable platform/device can also be considered a workstation assembly 21 and can include a height adjustment mechanism that is hidden inside a back panel assembly (or wall) as described above.

The workstation assembly 21 can include a mounting member coupled to a counterbalance mechanism as described above. The mounting member can be coupled to a first worksurface 13A (or platform, display, or any other item that can benefit from a height adjustment). The workstation assembly 21 can include first panel 20A and a second panel 20B having a first worksurface 13A and a second work surface 13B mounted opposite each other. The panel assembly can be located on a base 40 with casters 39. One or more vertical support members 11A-D can extend upwardly from the base 40 and first and second panels 20A, 20B can be coupled to the base 40 and/or vertical support members 11A-D.

One or more panels can be moved to a common area to create a workspace for two or more people. First and second panels 20A-B can be built in various heights. While a low panel height can encourage communication among users, a tall panel height can be used as a privacy panel. A panel surface 41 can be made of different materials, such as wood, metal, composite, a whiteboard, a tack holding material, a bulletin board. Workstation assembly 21, is shown having panels 20A-B each with one worksurface 13A, 13B opposing each other. In an example, workstation assembly 21 can be configured with any number of independently height adjustable worksurfaces. Each worksurface can be coupled to a corresponding counterbalance mechanism that can be concealed or hidden in the panel. In an example, panel 20A can include two worksurfaces, one on each opposing side of the panel 20A. In an example, panel 20B can include two worksurfaces, one on each opposing side of the panel 20B.

Figure 7A:
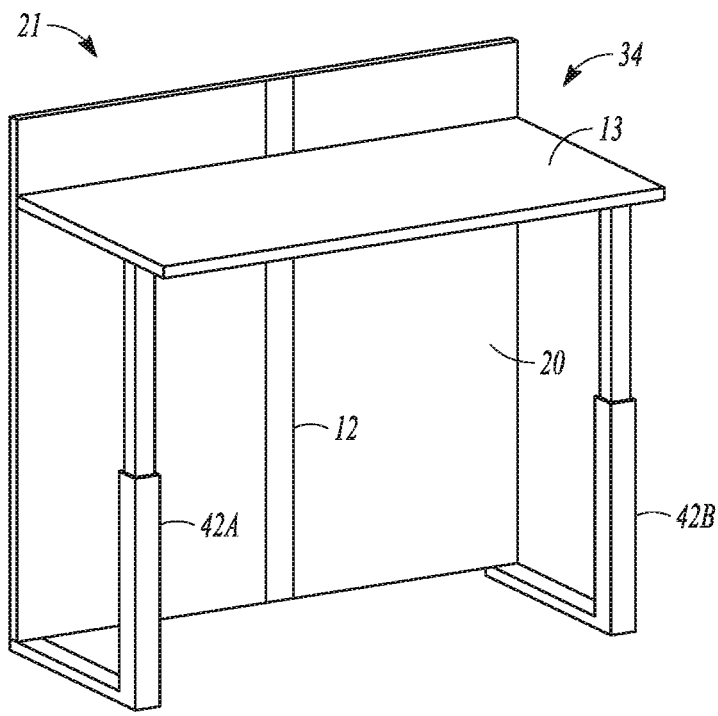
FIGS. 7A-B illustrate perspective views of a workstation assembly having mounting members/platforms/worksurfaces coupled to telescoping legs, in accordance with at least one example of the present disclosure.
Figure 7B:
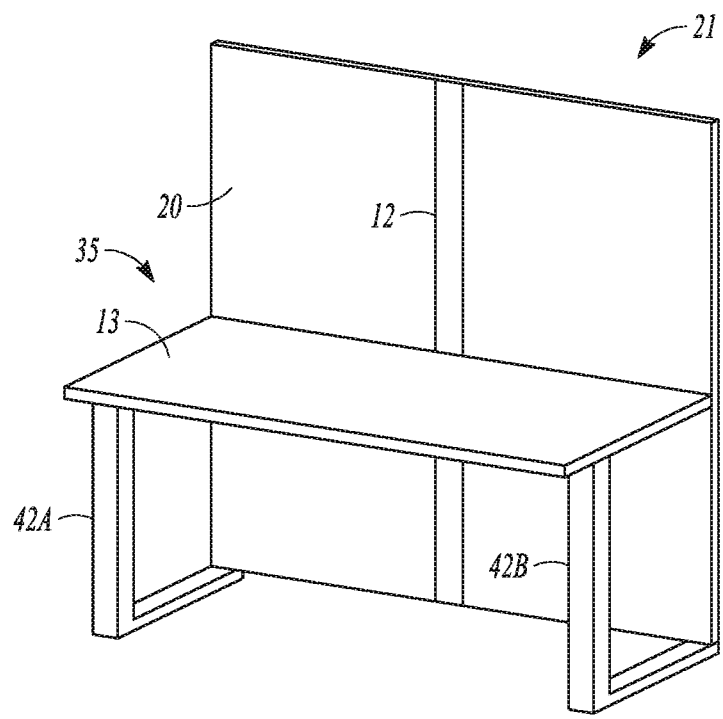

FIG. 7-B illustrate a perspective view of a workstation assembly 21 having mounting members/platforms/worksurfaces coupled to first and second telescoping legs 42A, 42B, in accordance with at least one example of the present disclosure. In some examples, one or more telescoping legs can support the worksurface 13 to prevent cantilever loading of the platform. In this example, a counterbalance mechanism 12 can be located inside the panel 20. In an alternative example, a counterbalance mechanism can be located inside one or both of the first and second telescoping legs 42A, 42B. Cable management features can be located inside the panel 20 to provide a neater workspace. The panel 20 can also be used as a privacy panel. In an example, the workstation assembly 21 in FIG. 7A has been raised to an upper position 34. In an example, the workstation assembly 21 in FIG. 7B has been adjusted to a lower position 35.

Figure 8A:
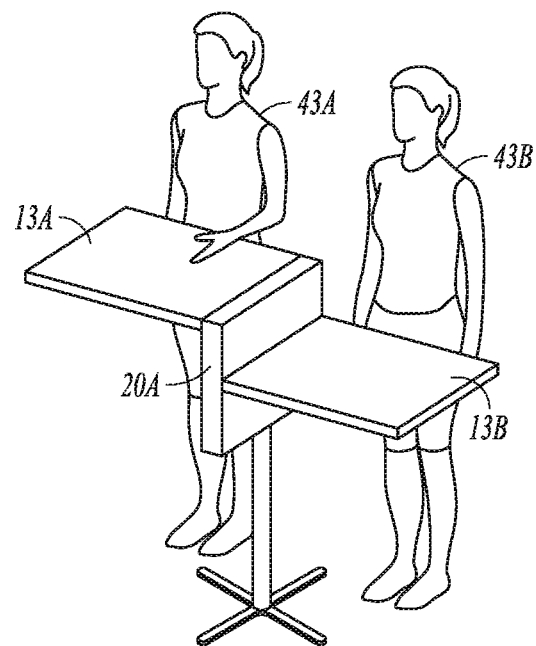
FIGS. 8A-8C illustrate views of a workstation assembly with a smaller panel assembly located on a riser, in accordance with at least one example of the present disclosure.
Figure 8B:
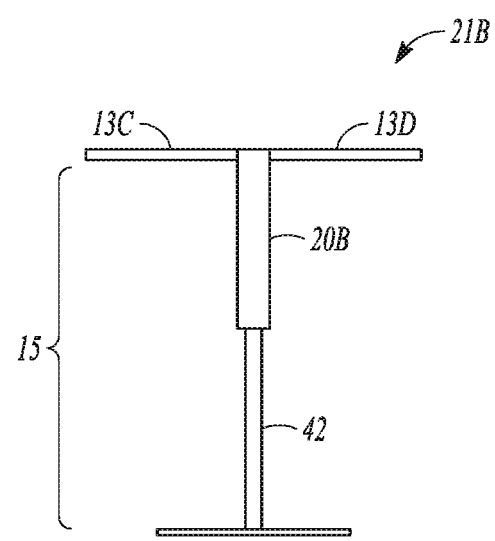
Figure 8C:
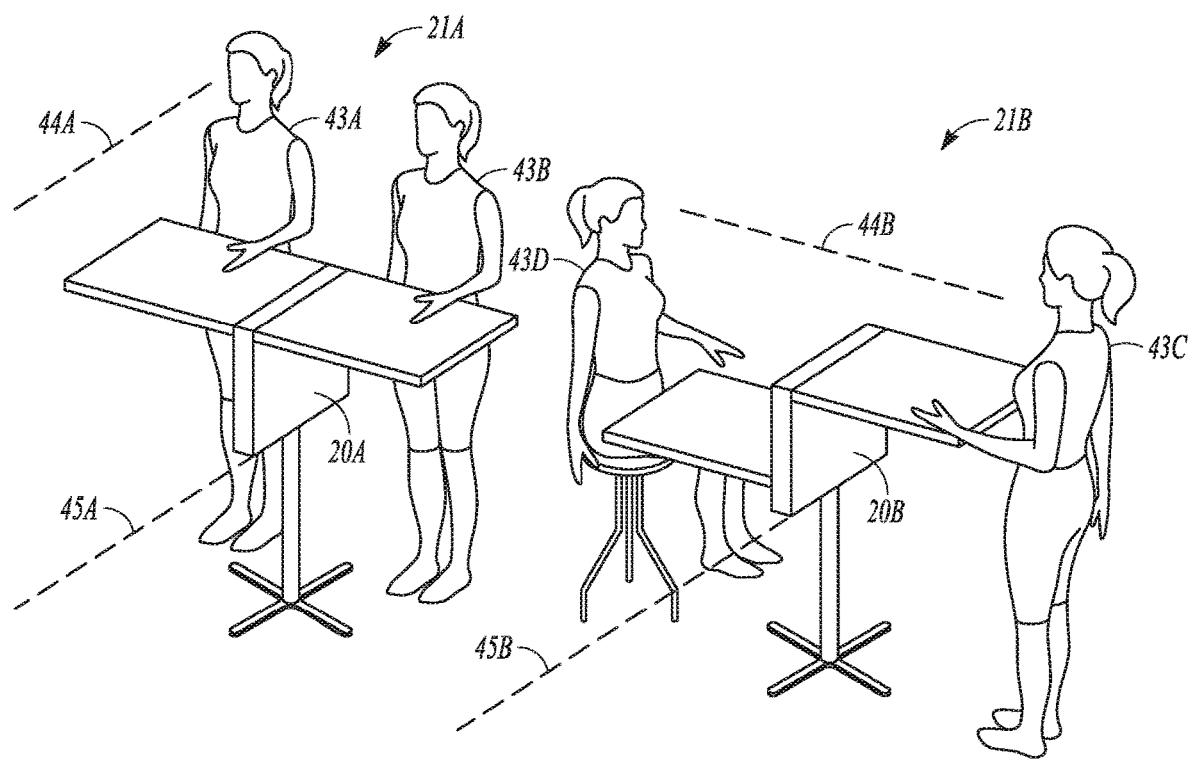

FIGS. 8A-8C illustrates views of a workstation assemblies 21A, 21B with a smaller panel assembly located on a riser, in accordance with at least one example of the present disclosure. In some examples, a panel 20A, 20B can be small, have a low profile and can be located on a vertical support member 11. In an example, the vertical support member 11 can be a riser or telescoping leg, and panels 20A, 20B can hold one or more independently adjustable worksurfaces 13A-D. The vertical support member 11 can be at a fixed height. A base 40 of the vertical support member 11 can be stationary or it can be located on casters. Counterbalance mechanisms can be located inside a panel 20A. The panel 20A can include two counterbalance mechanisms (lift engines) so that a panel 20A having two worksurfaces 13A-B can allow independent adjustability of the worksurfaces 13A-B.

In an example shown in FIG. 8C, workstation assembly 21A can be configured so that a first user 43A can work side by side a second user 43B. A first viewing axis 44A of users 43A, 43B can be generally parallel to a long axis 45A of panel 20A. In an example, workstation assembly 21B can be configured so that a third user 43C can work facing a fourth user 43D. A second viewing axis 44B of users 43C and 43C can be generally perpendicular to a long axis 45B of panel 20B. In an example, each user can choose either viewing axis position described above.

Figure 9:
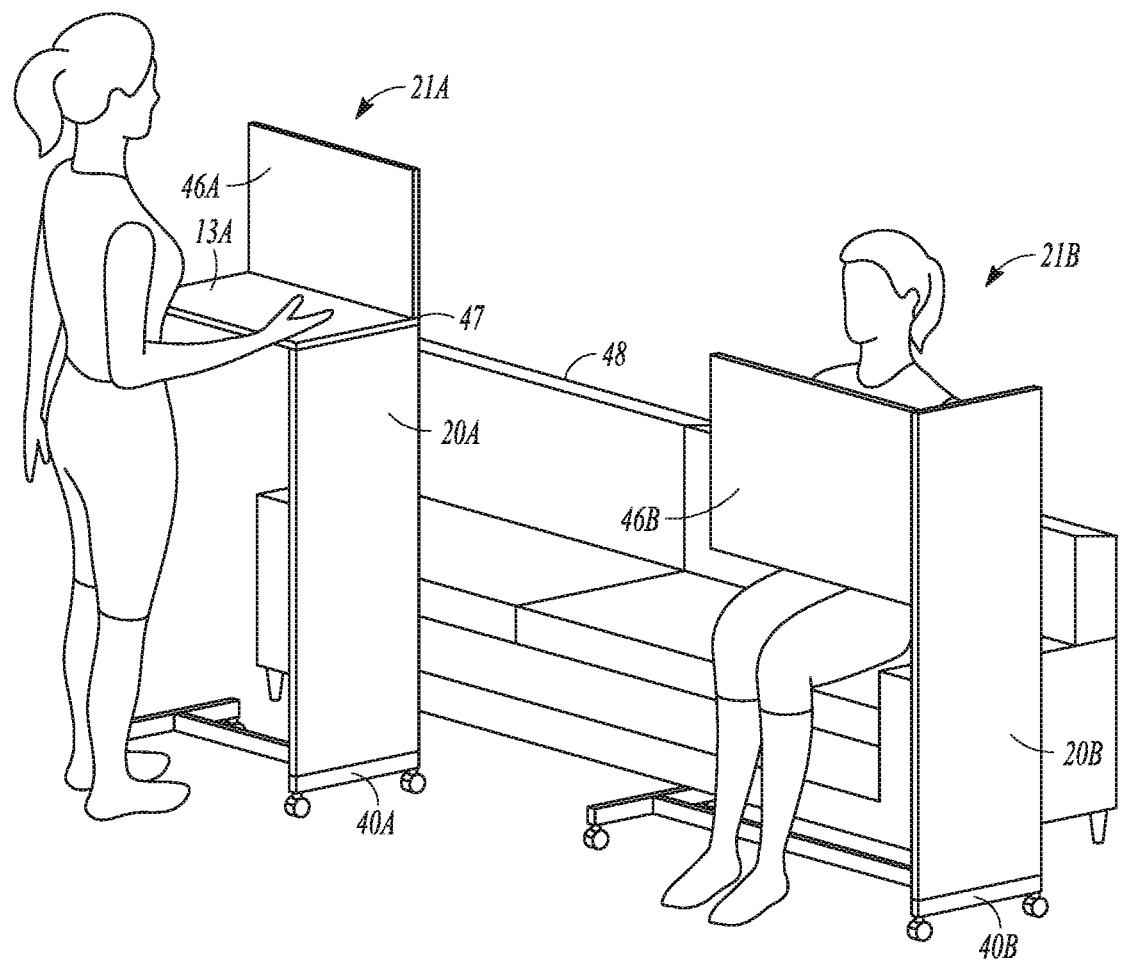
FIG. 9 illustrates perspective view of a workstation assembly with a smaller panel located on a riser, in accordance with at least one example of the present disclosure.

FIG. 9 illustrates perspective view of workstation assemblies 21A, 21B with a panel 20A, 20B that can be located on a riser, in accordance with at least one example of the present disclosure. In an example a counterbalance mechanism can be located inside a panel 20A, 20B. The panel 20A, 20B can be offset to one side of a user. A privacy screen 46A, 46B can be located at a rear edge 47 of the worksurface 13A, 13B (13B hidden from view). The workstation assemblies 21A, 21B can include a base 40A, 40B. The base 40A, 40B can be on casters 39 and the base 40A, 40B can support the panel 20A, 20B. The base 40A, 40B can be elongated away from the panel 20A, 20B which can allow the base 40B fit under furniture 48 such as a couch or bed.

Figure 10:
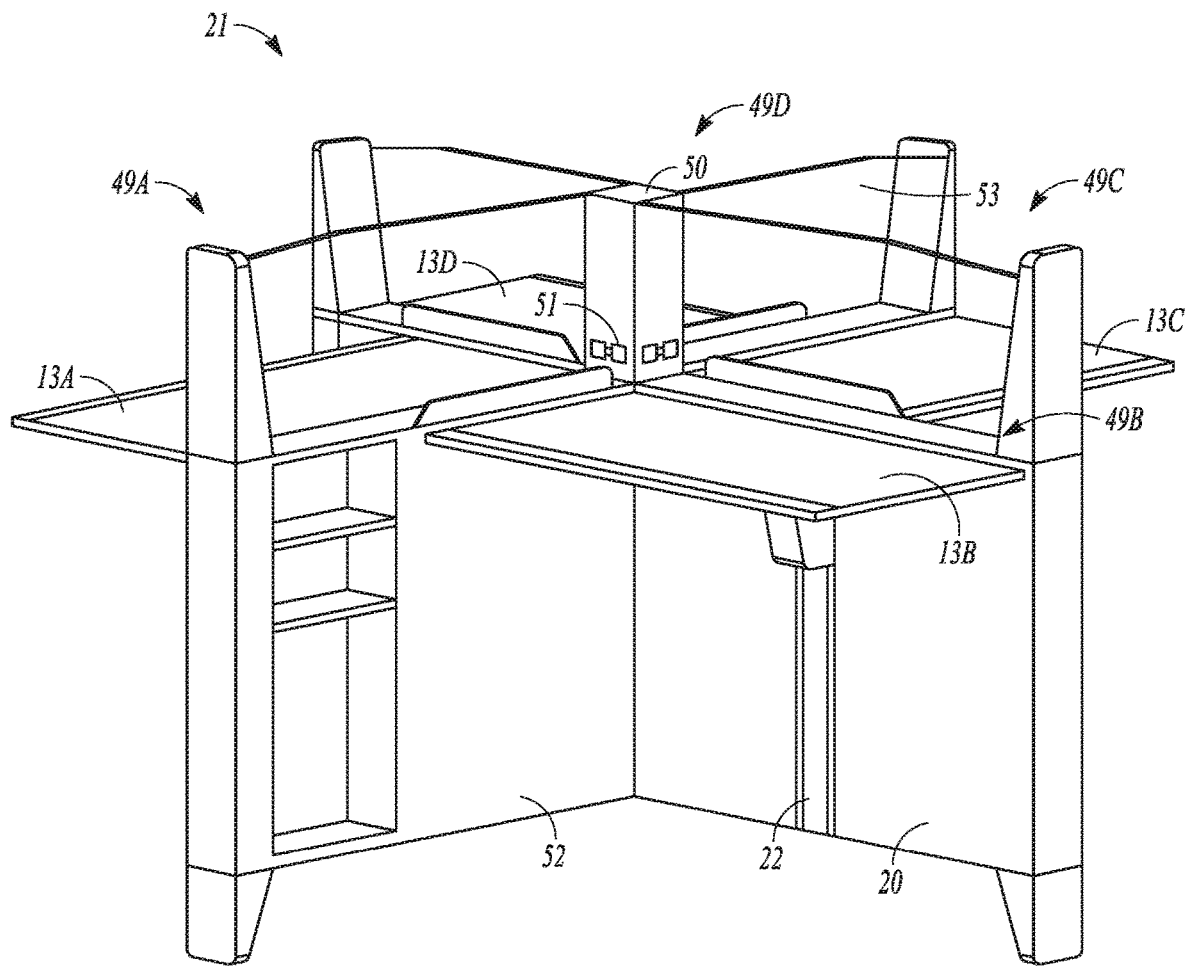
FIG. 10 illustrates a workstation assembly having panels containing a lift mechanism arranged around a center column, in accordance with at least one example of the present disclosure.

FIG. 10 illustrates a workstation assembly 21 having a plurality of workstations 49A-D and can include panels 20 containing a lift mechanism 22 arranged around a center column 50, in accordance with at least one example of the present disclosure. In the present disclosure "lift mechanism" may also be referred to as a "counterbalance mechanism". Each workstation 49A-D can provide an individual work area having a worksurface 13A-D that can be height adjustable.

Panels 20 can contain a lift mechanism 22 and can be arranged around a center column 50. The center column 50 can include power outlets 51 accessible by all of the workstations 49A-D. The workstations 49A-D can be separated by privacy screens 53. Each panel 20 can include more than one lift mechanism 22. The lift mechanism 22 can include an energy storage member such as a spring, a gas spring, an electric or hydraulic actuator. The lift mechanism 22, can be adjusted to support the weight of the worksurface 13B and items placed upon it such as a computer, books, or, display and allow a user to make height adjustments of the worksurface 13B with a minimal effort. The lift mechanism 22 can include a locking mechanism to lock or release movement of the lift mechanism 22. The workstation assembly 21 can have privacy panels 52 that do not include lift mechanisms 22. Each lift mechanism 22 can allow the worksurface 13A-D of each workstation 49A-D to be raised or lowered for a height adjustment. In an example, the workstation assembly 21 is illustrated as having four workstations 49A-D. In an example, workstation assembly 21, can be configured to include more than four or less than four workstations.

Figure 11:
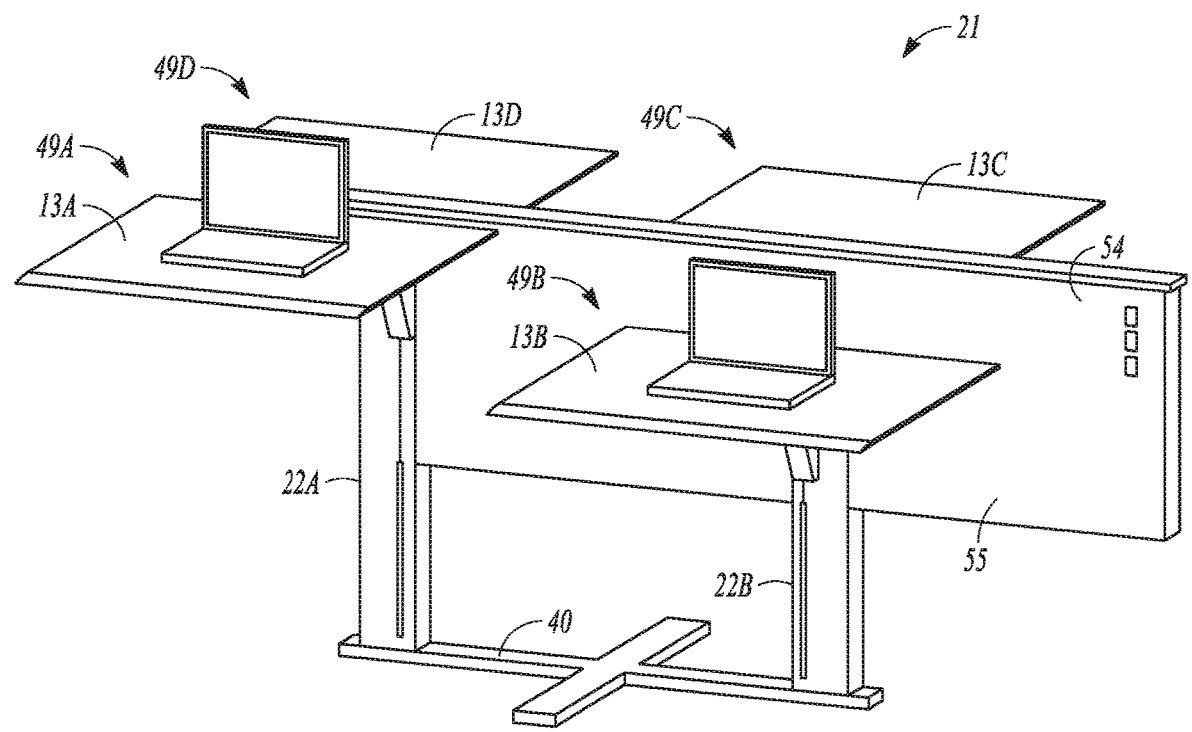
FIG. 11 illustrates an example of a workstation assembly having an elongated panel that can house multiple lift mechanisms for several workstations, in accordance with at least one example of the present disclosure.

FIG. 11 illustrates an example of a workstation assembly 21 having an elongated panel 54 that can include multiple lift mechanisms 22A, 22B for several workstations, such as workstations 49A-D, in accordance with at least one example of the present disclosure (lift mechanisms 22C and 22D can face the opposite side of the workstation assembly 21). The elongated panel 54 can include an asymmetric configuration 55 to allow attachment of multiple worksurfaces 13A-D. The workstation assembly 21 can include one or more workstations 49A-D that can be attached to the elongated panel 54. The lift mechanisms 22A-D can allow each worksurface 13A-D to be independently height adjustable. The workstation assembly 21 can include a base 40 that can be flat to sit on a flat floor, or it can have wheels to easily move it around a room.

Figure 12:
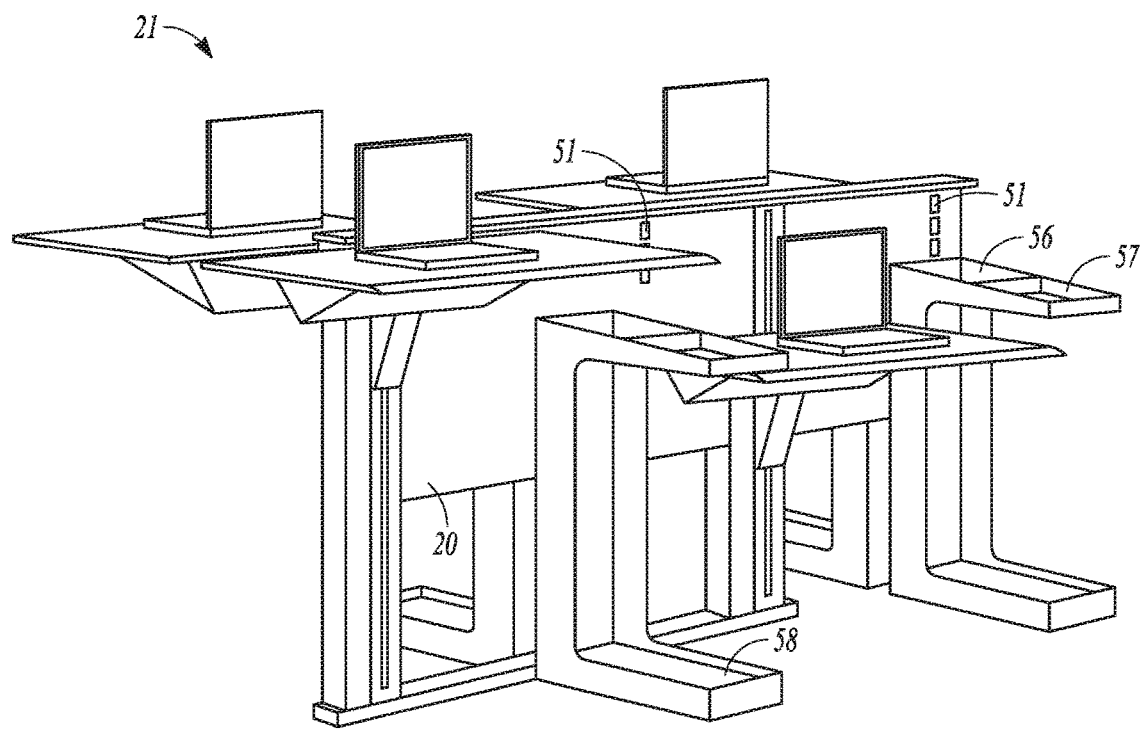
FIG. 12 illustrates an example of a workstation assembly having electrical outlets, cable management channels, and other accessories mounted inside or over a panel, in accordance with at least one example of the present disclosure.

FIG. 12 illustrates an example of a workstation assembly 21 having power outlets 51, cable management channels 56, and other accessories, such as a shelving tray 57 mounted on or near a panel 20, in accordance with at least one example of the present disclosure. The workstation assembly 21 can include a lower storage shelf 58 that can be connected to the cable management channel 56.

Figure 13:
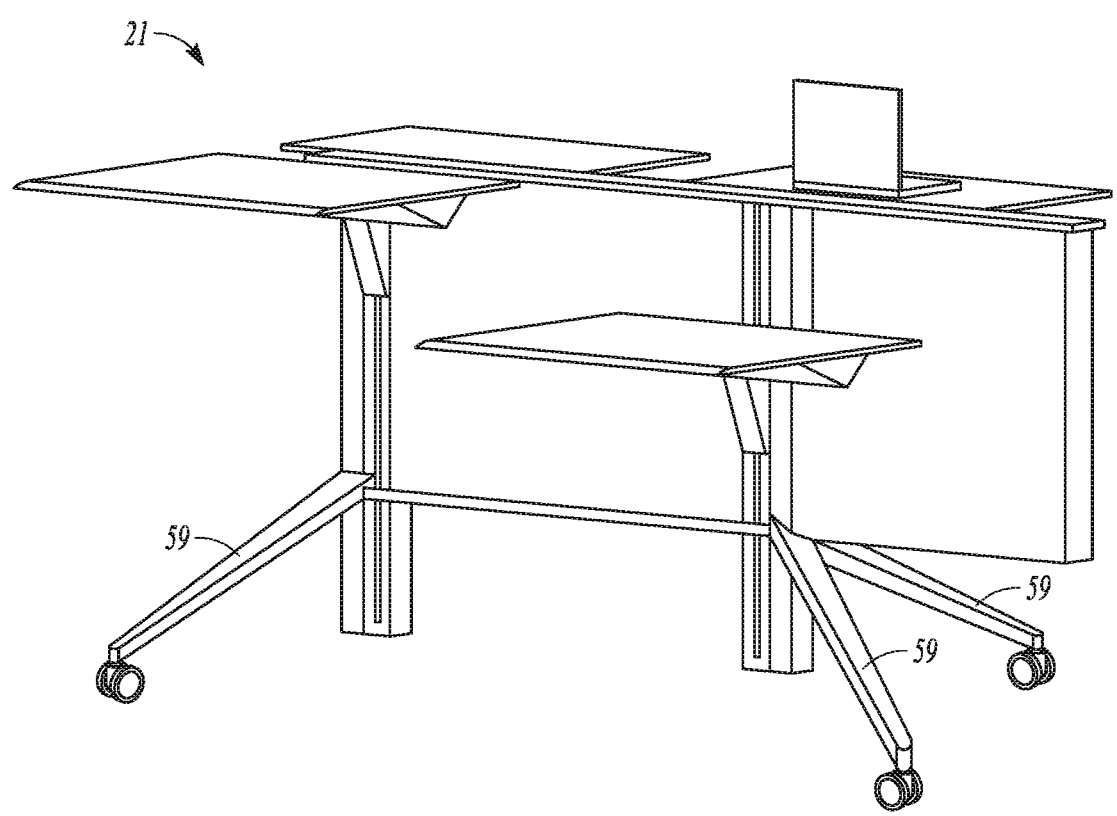
FIG. 13 illustrates a workstation assembly with a wheeled base, in accordance with at least one example of the present disclosure.

FIG. 13 illustrates a workstation assembly 21 with a wheeled base 59, in accordance with at least one example of the present disclosure.

Figure 14:
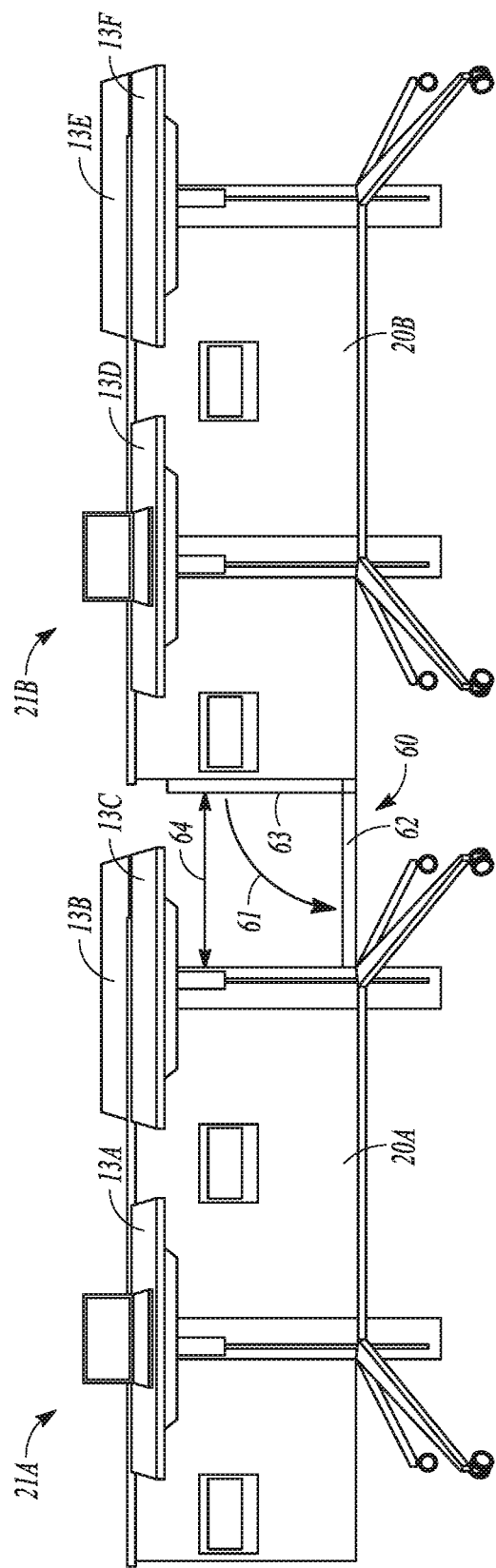
FIG. 14 illustrates an example of a workstation assembly having connected panels, in accordance with at least one example of the present disclosure.

FIG. 14 illustrates an example of two workstation assemblies 21A-B that can include panels 20A and 20B that can be connected, in accordance with at least one example of the present disclosure. The panels 20A-B of the workstation assemblies 21A-B can be connected to provide a plurality of height adjustable worksurfaces 13A-F to accommodate a large number of users. The panels 20A-B can be physically connected together, and electrical systems of each workstation assembly 21A-B can also connected. Electrical power can be transferred from a workstation assembly 21A to another workstation assembly 21B by a power connection 60. The power connection 60 can include all necessary power or network wiring and connectors needed for any type of computer, communications, and/or electrical connection. The power connection 60 can include a swiveling action 61 having a latched position 62 and an unlatched position 63. Although the panels 20A and 20B are illustrated in a straight line, they can also be connected at various angles. Dimension 64 can be configured to any desired length and panels 20A, 20B can be latched or attached together.

Figure 15:
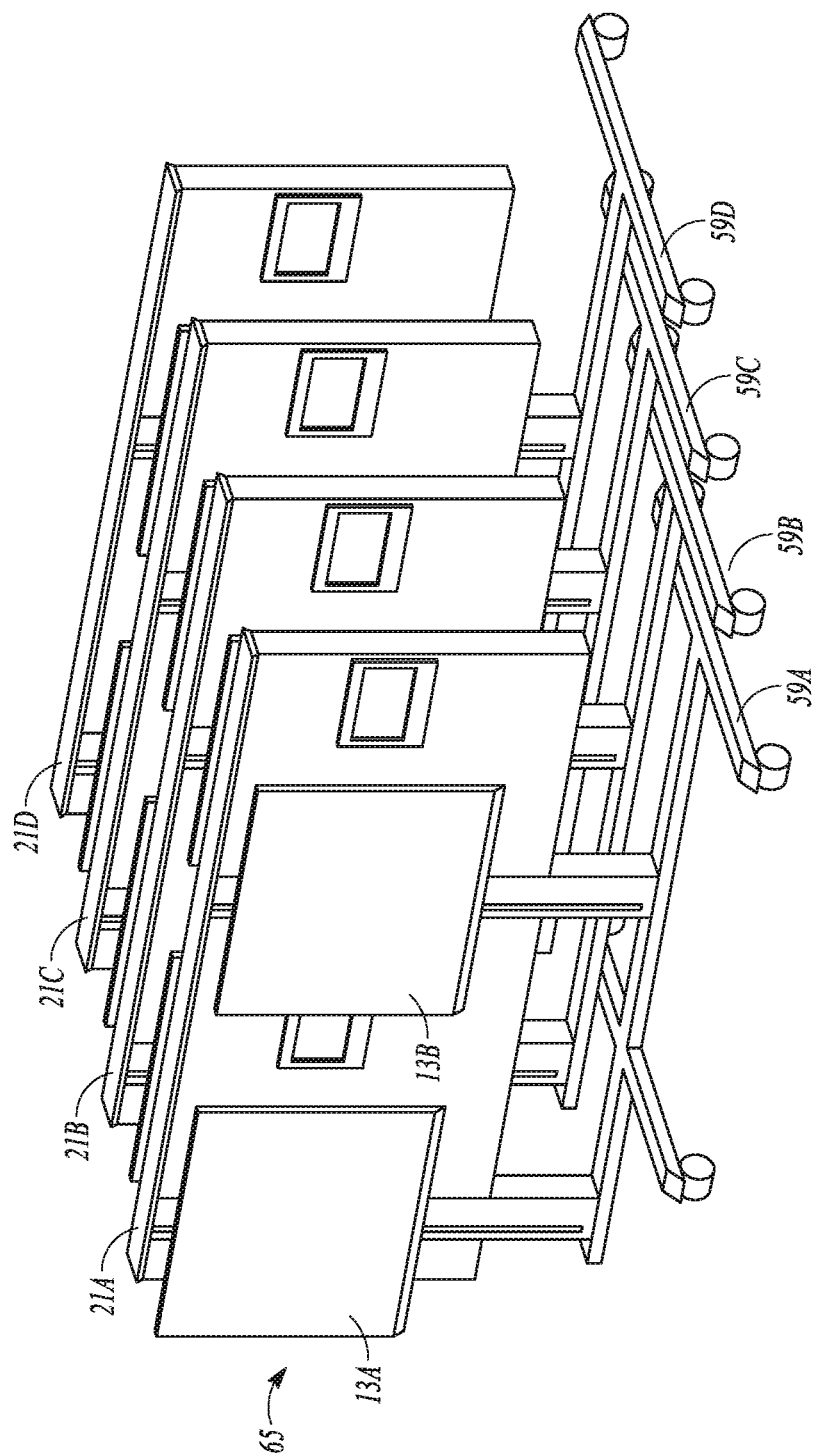
FIG. 15 illustrates an example of workstation assemblies folded to a stowed position, in accordance with at least one example of the present disclosure.

FIG. 15 illustrates an example of workstation assemblies 21A-D folded to a stowed position 65, in accordance with at least one example of the present disclosure. For example, as seen in FIG. 15, worksurfaces 13A-13B of workstation assembly 21A are folded into a vertical position. Each worksurface 13A-B connected to a workstation assembly 21A can be folded to allow stowing them when they are not in use. The wheeled bases 59A-D can be configured so that the workstation assemblies 21A-D can be nested together to allow easy stowage and use when needed.

Figure 16A:
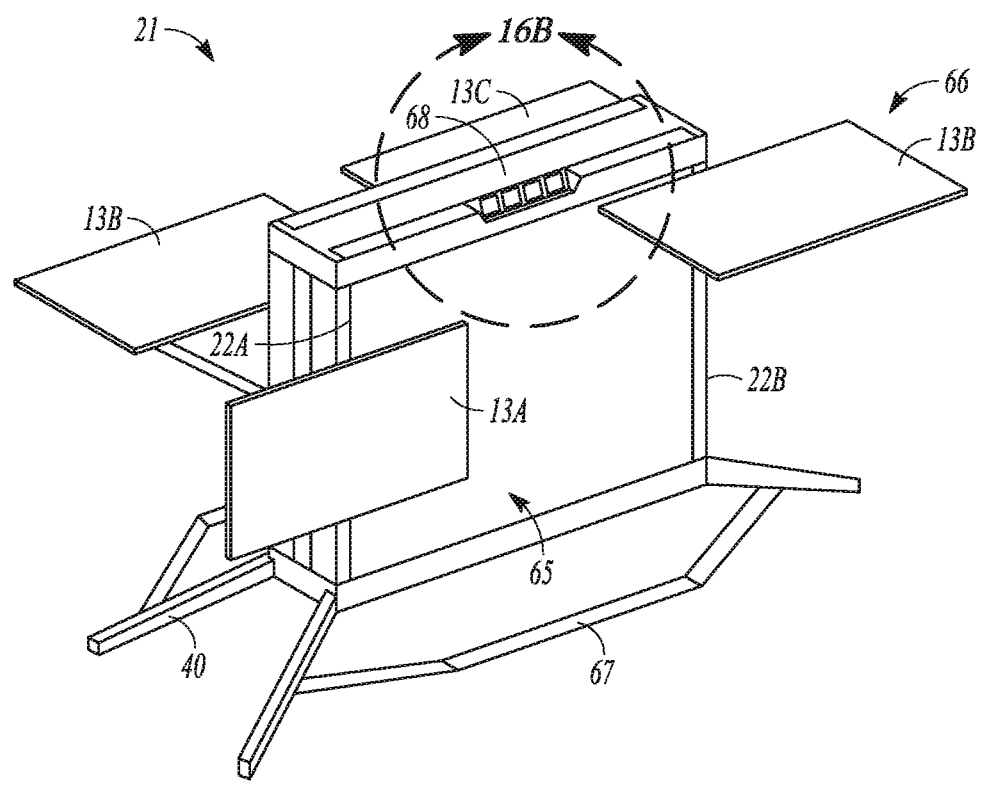
FIG. 16A illustrates a front perspective view of a workstation assembly with a central panel and folding height adjustable worksurfaces, in accordance with at least one example of the present disclosure.

FIG. 16A illustrates a side perspective view of a workstation assembly 21 with a central panel 68 and worksurfaces 13A-D that can be configured to fold to a stowed position 65 (as in worksurface 13A) and deploy to a working position 66 (as in worksurface 13B). The worksurfaces 13A-D can be height adjustable with the aid of lift mechanisms 22A-D (22C-D hidden), in accordance with at least one example of the present disclosure. The workstation assembly 21 can also include one or more folding foot rests 67 attached to a base 40.

Figure 16B:
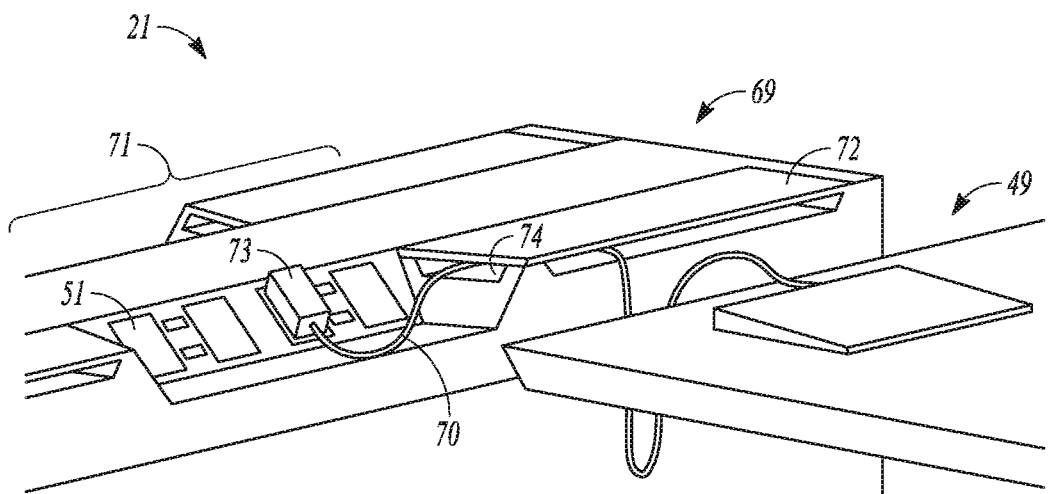
FIG. 16B illustrates an example of a workstation assembly having concealed cable management that can be used to route cables from the central power hub to each workstation, in accordance with at least one example of the present disclosure.

FIG. 16B illustrates an example of a workstation assembly 21 having a concealed cable management system 69 that can be used to route cables 70 from a central power hub 71 to each workstation 49, in accordance with at least one example of the present disclosure. The concealed cable management system 69 can include a cable management cover 72 and various electrical connectors 73, power outlets 51, and/or cable routing grooves/passages 74.

Figure 17A:
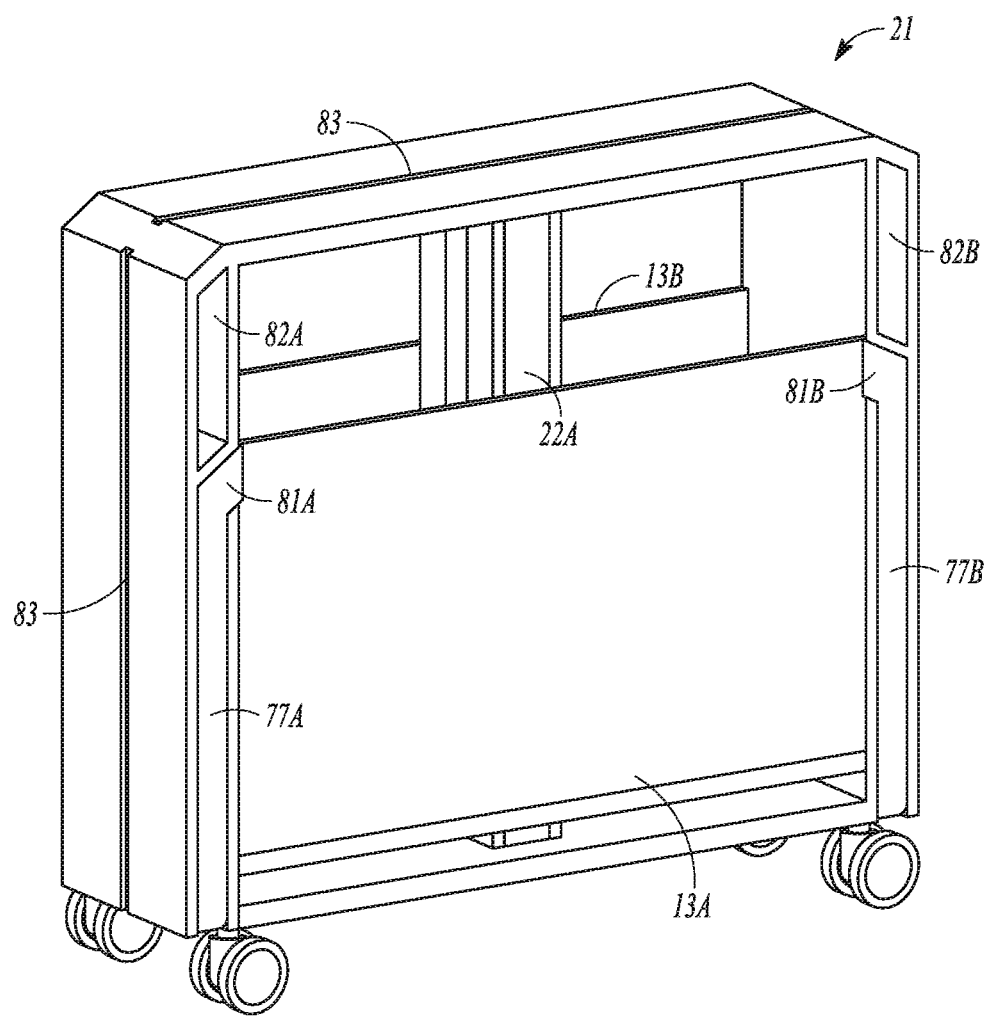
FIG. 17A illustrates an example of a workstation assembly having a stowed configuration of a worksurface and legs, in accordance with at least one example of the present disclosure.
Figure 17B:
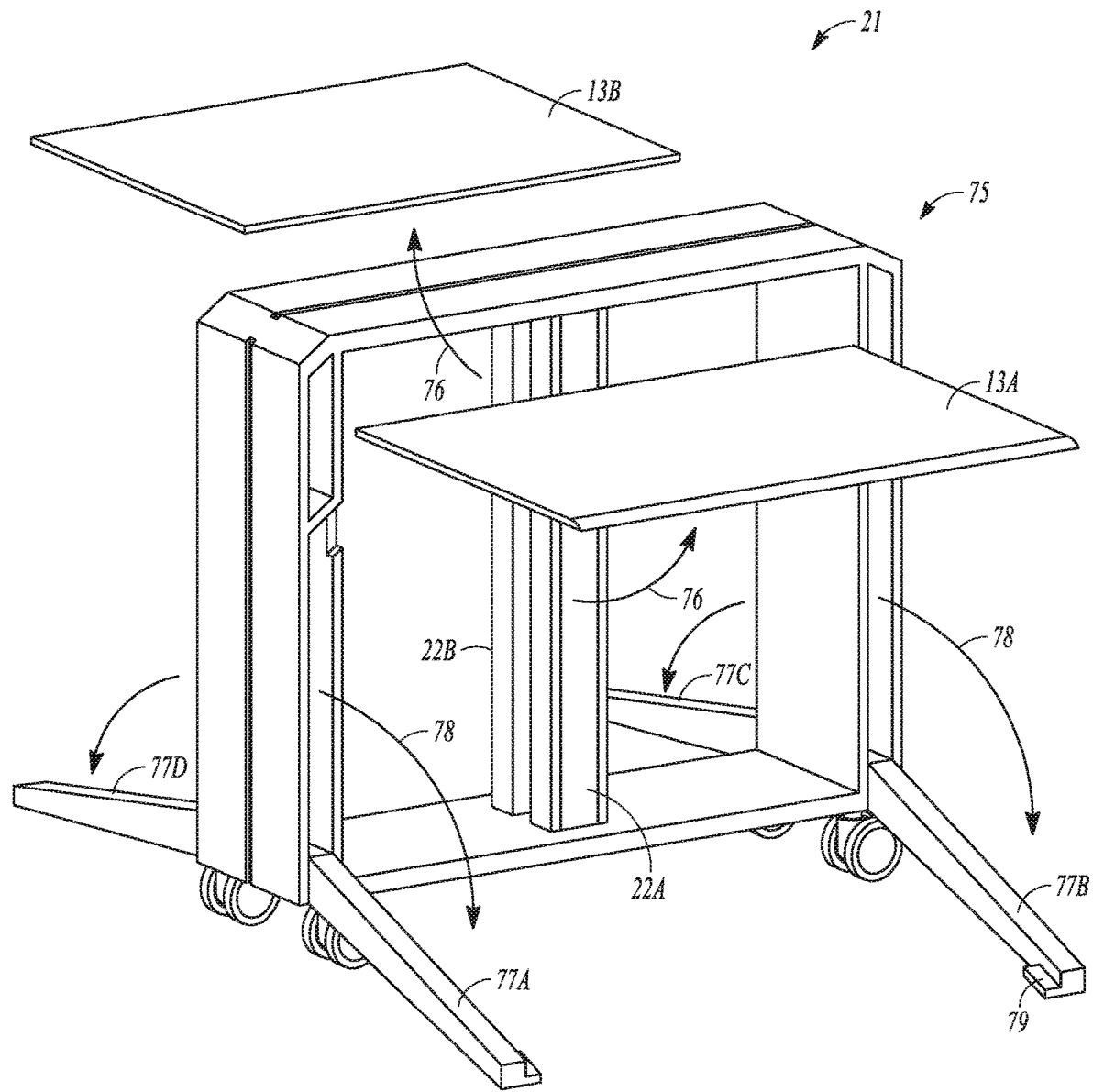
FIG. 17B illustrates an example of a workstation assembly having an expanded configuration of the worksurfaces, in accordance with at least one example of the present disclosure.

FIG. 17A illustrates an example of a workstation assembly 21 having a stowed configuration 80 of a worksurfaces 13A-B and legs 77A-D (77C and 77D, shown in FIG. 17B, are hidden), in accordance with at least one example of the present disclosure. The stowed configuration 80 can be beneficial for storage or rearranging of the workstation assembly 21. The legs 77A-B can include a portion, such as a tang, that can overlap the worksurface 13A at left and right sides 81A-B when stowed which can prevent unfolding of worksurface 13A before extending the legs 77A-B out for stability. The workstation assembly 21 can include: handles 82A-B for moving, and an accessory channel 83 (left side, right side—hidden, and top). The accessory channel 83 can include routing channels for cables and/or mounting channels for accessories. The workstation assembly 21 can include lift mechanisms 22A-B (22B hidden) and swiveling casters 39.

FIG. 17B illustrates an example of a workstation assembly 21 having an expanded configuration 75 of the worksurfaces 13A-B, in accordance with at least one example of the present disclosure. The expanded configuration 75 can allow one or both of the worksurfaces 13A-B to flip up 76. The worksurfaces 13A-B can be raised and lowered independently with the lift mechanisms 22A-B (mountings members are not shown). The legs 77A-D can deploy to stabilize the workstation assembly 21 when worksurfaces 13A-B are deployed to a working position. The legs can be configured to extend 78 before the worksurfaces 13A-B are deployed 76 to prevent loading of the worksurfaces 13A-B without the support of the legs 77A-D. An overlapping member 79 can be located at the end of a leg (shown on 77B).

Figure 18:
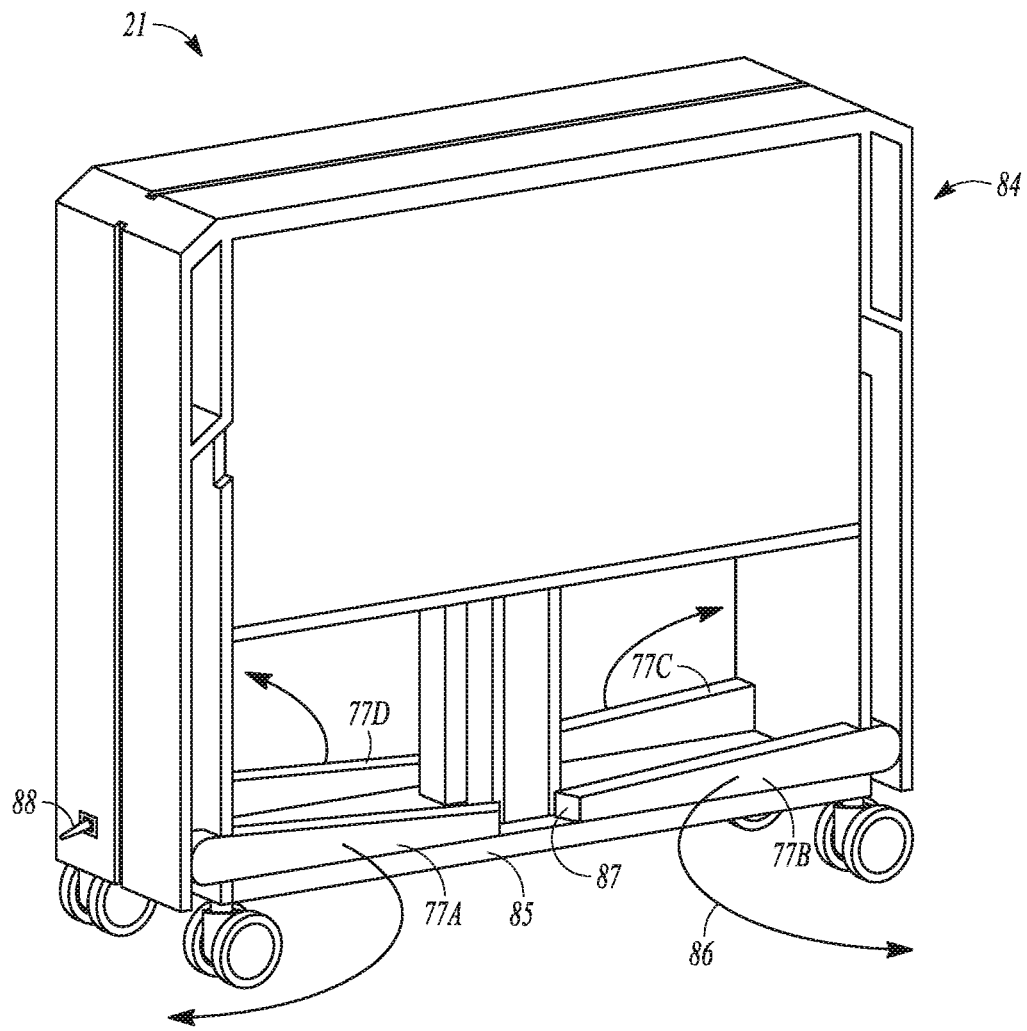
FIG. 18 illustrates an example of a workstation assembly having an alternative example of a leg stowing configuration, in accordance with at least one example of the present disclosure.

FIG. 18 illustrates an example of a workstation assembly 21 having an alternative example of a leg stowing configuration 84, in accordance with at least one example of the present disclosure. In an example, the leg stowing configuration 84 can include having legs 77A-D stow along the bottom 85 and rotate out horizontally 86. The leg stowing configuration 84 can generally conceal the foot 87. The workstation assembly 21 can include a foot-actuated lever 88 that can release and lock the legs 77A-D so that the user would never have to bend over. For safety, the deployment of the legs 77A-D (e.g., like an outrigger) could have a natural swing down/out into the "stabilizing" position and swing up/in for storage. The actuation of the legs 77A-D can engage or disengage the ability to release the worksurface 13A into a horizontal position.

Figure 19A:
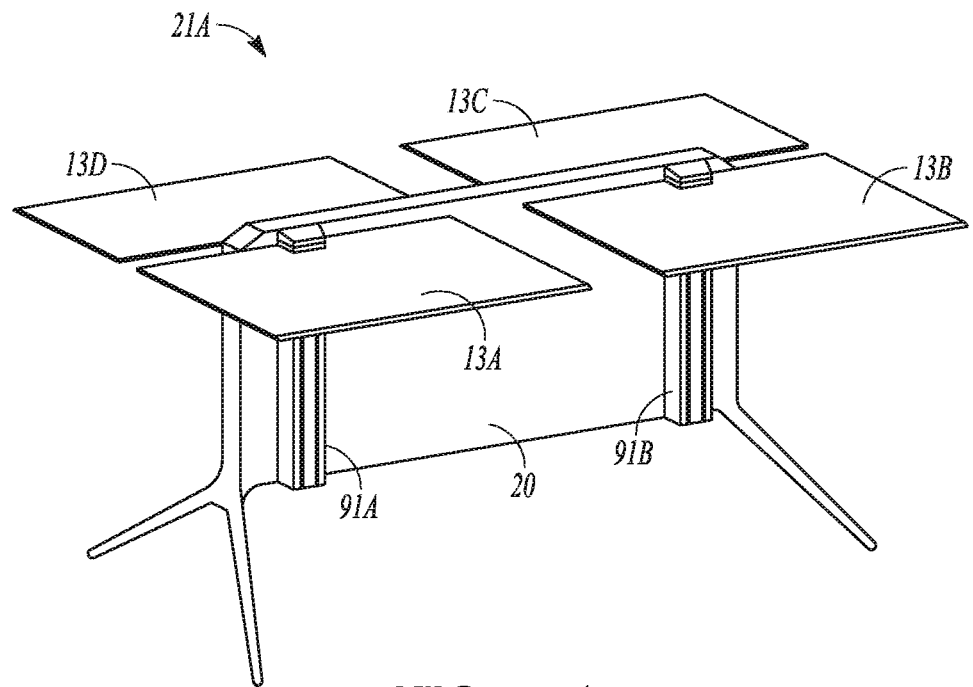
FIGS. 19A-B illustrate examples of workstation assemblies having a lift mechanism that can be external to a panel member, in accordance with at least one example of the present disclosure.
Figure 19B:
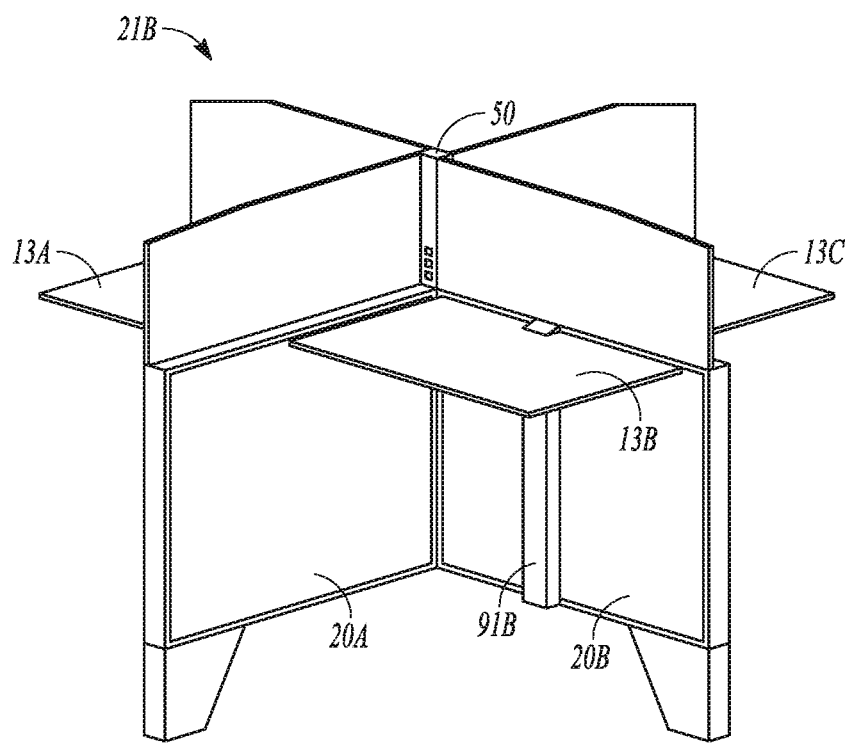

FIGS. 19A-B illustrate examples of workstation assemblies having a lift mechanism that can be external to a panel member, in accordance with at least one example of the present disclosure. In FIG. 19A, a workstation assembly 21A can include worksurfaces 13A-D that are height adjustable by means of an external lift mechanism 91A-B (91C-D are hidden by this view). The external lift mechanisms 91A-B can be all or partly outside the surface of the panel 20.

FIG. 19B illustrates a workstation assembly 21B having four worksurfaces 13A-D located around a center column 50 (13D hidden). An external lift mechanism 91B can be all or partly outside the surface of panel 20B.

Figure 20:
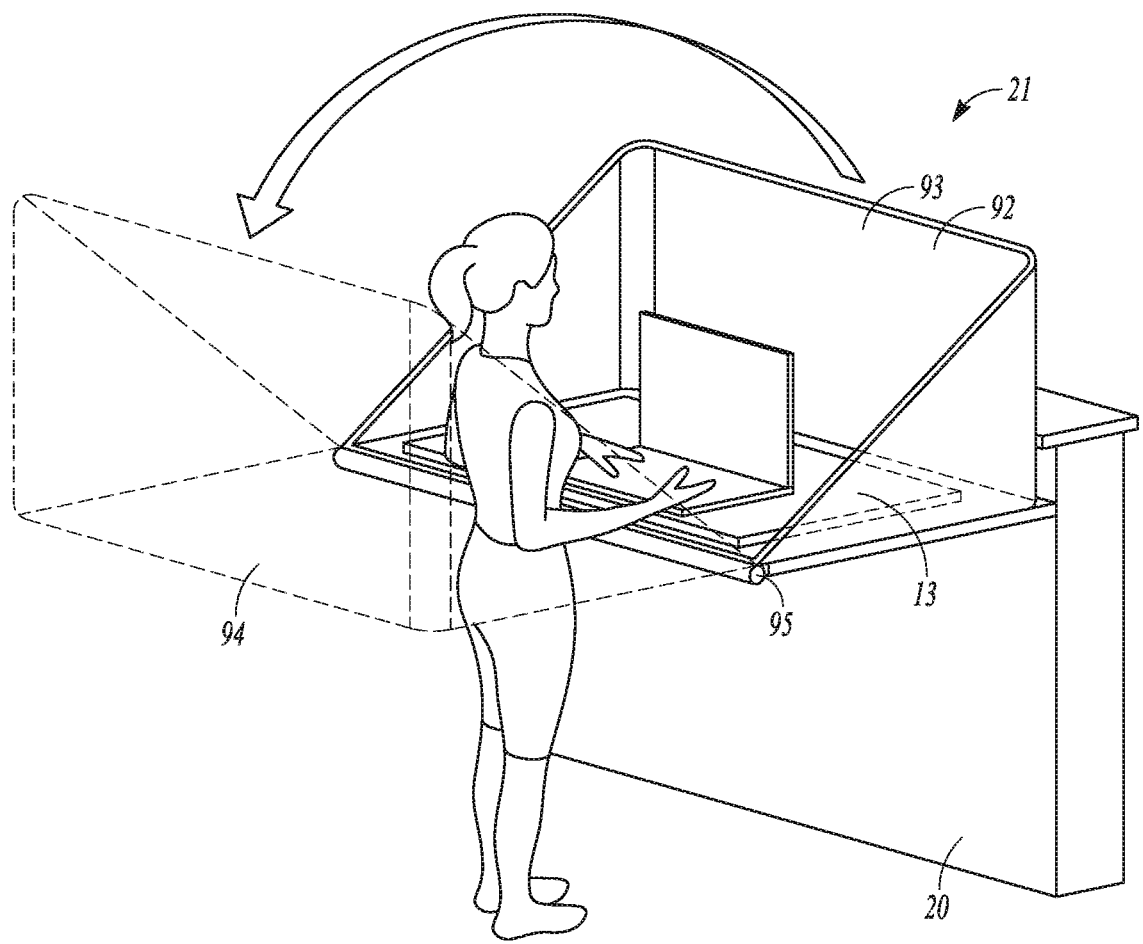
FIG. 20 illustrates an example of workstation assembly having a swinging privacy panel that can be adjusted to either forward or rearward facing positions, in accordance with at least one example of the present disclosure.

FIG. 20 illustrates an example of workstation assembly having a swinging privacy panel that can be adjusted to either forward or rearward facing positions, in accordance with at least one example of the present disclosure. The workstation assembly 21 can include a panel 20 and a worksurface 13. A swinging privacy panel 92 can include a forward position 93 and a rearward position 94 and can be configured as a lightweight assembly that can form a barrier to block sound, light, and/or sight. A hinged attachment 95 can be configured to limit the movement of the swinging privacy panel 92 to a desired arc (e.g. adjustable position settings in either the forward position 93 or the rearward position 94). The hinged attachment 95 can attach the swinging privacy panel 92 to the worksurface 13, or in another example, the swinging privacy panel 92 can be coupled to the panel 20.

Figure 21:
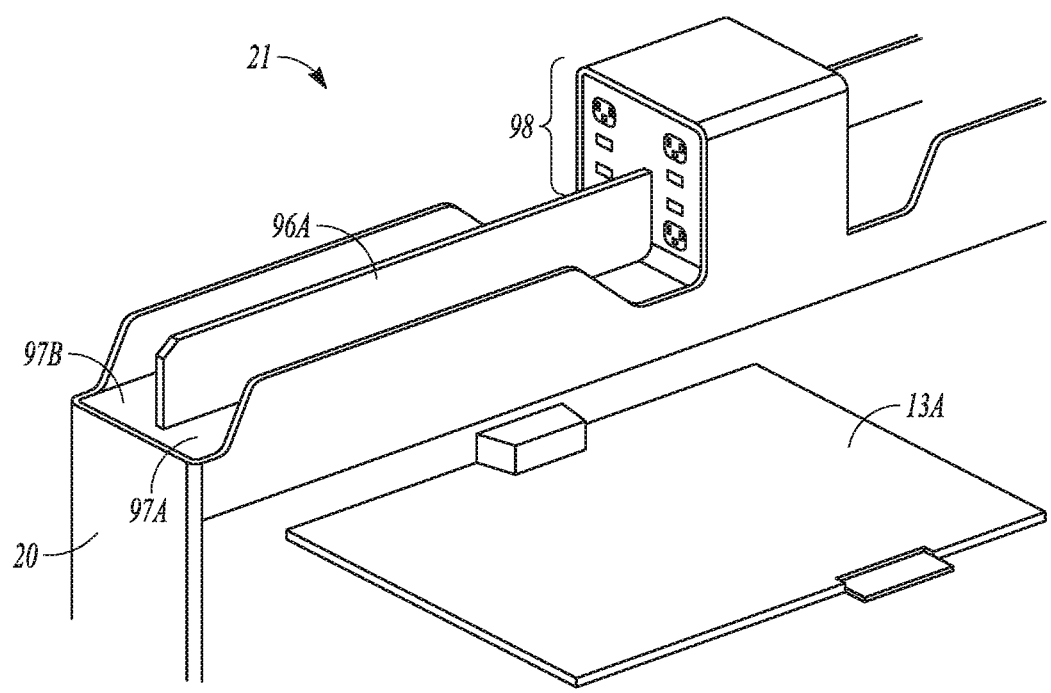
FIG. 21 illustrates a workstation assembly having a height adjustable privacy panel, in accordance with at least one example of the present disclosure.

FIG. 21 illustrates a workstation assembly having a height adjustable privacy panel, in accordance with at least one example of the present disclosure. The workstation assembly 21 can include a height adjustable privacy panel 96. The height adjustable privacy panel 96 can be configured to move upwardly and downwardly within the panel 20. The height adjustable privacy panel 96 can create channels 97A and 97B on either side of the height adjustable privacy panel 96 for locating cables, pens, or other accessories. Electrical connections 98 can be configured for each channel 97A-B.

Figure 22:
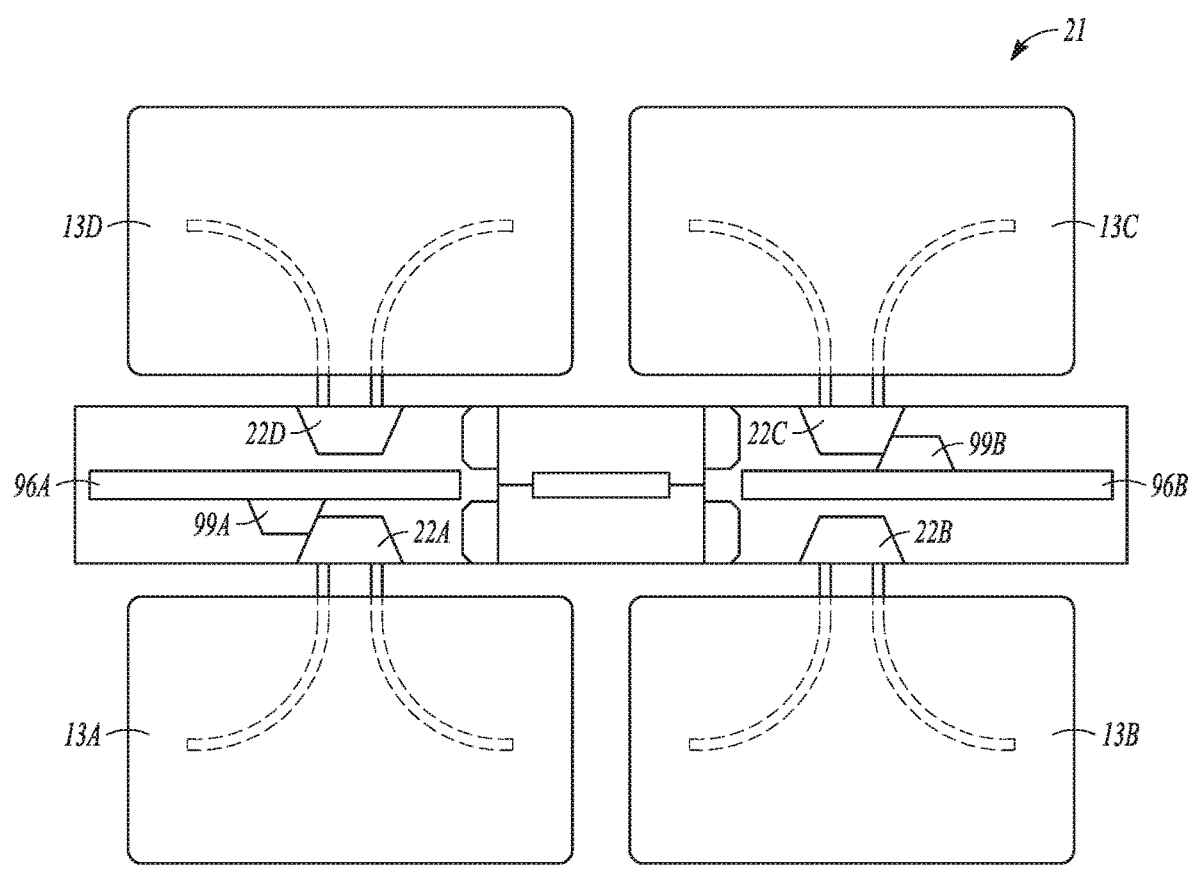
FIG. 22 illustrates a top view of the workstation assembly shown in FIG. 21 having independently height adjustable worksurfaces and independently height adjustable privacy panels, in accordance with at least one example of the present disclosure.

FIG. 22 illustrates a top view of the workstation assembly shown in FIG. 21 having independently height adjustable worksurfaces and independently height adjustable privacy panels, in accordance with at least one example of the present disclosure. Each height adjustable privacy panel 96A-B can include a privacy panel lift mechanism 99A-B. The privacy panel lift mechanism 99A-B can be separate from the lift mechanisms 22A-D that can provide height adjustment for worksurfaces 13A-D

Figure 23A:
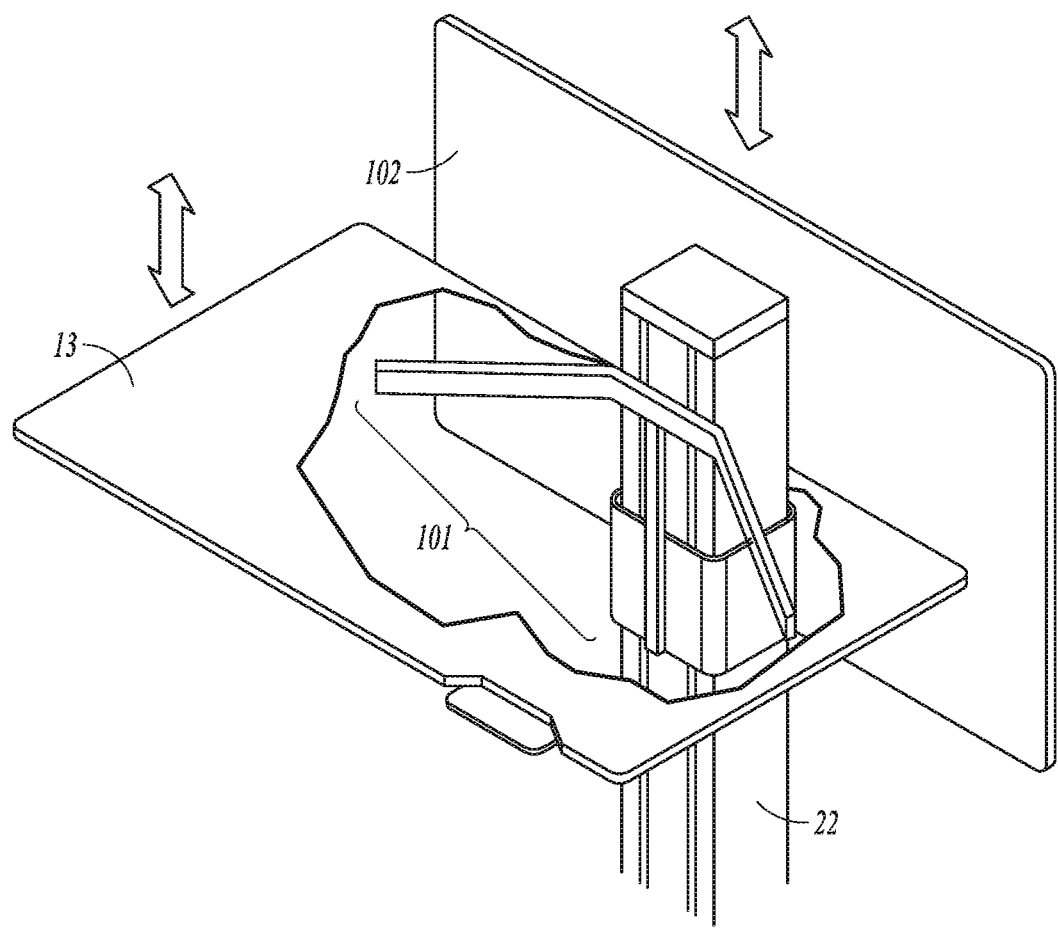
FIG. 23A illustrates a workstation assembly having a privacy panel that can move together with a height adjustable worksurface and can also include an independent height adjustment for the privacy panel, in accordance with at least one example of the present disclosure.
Figure 23B:
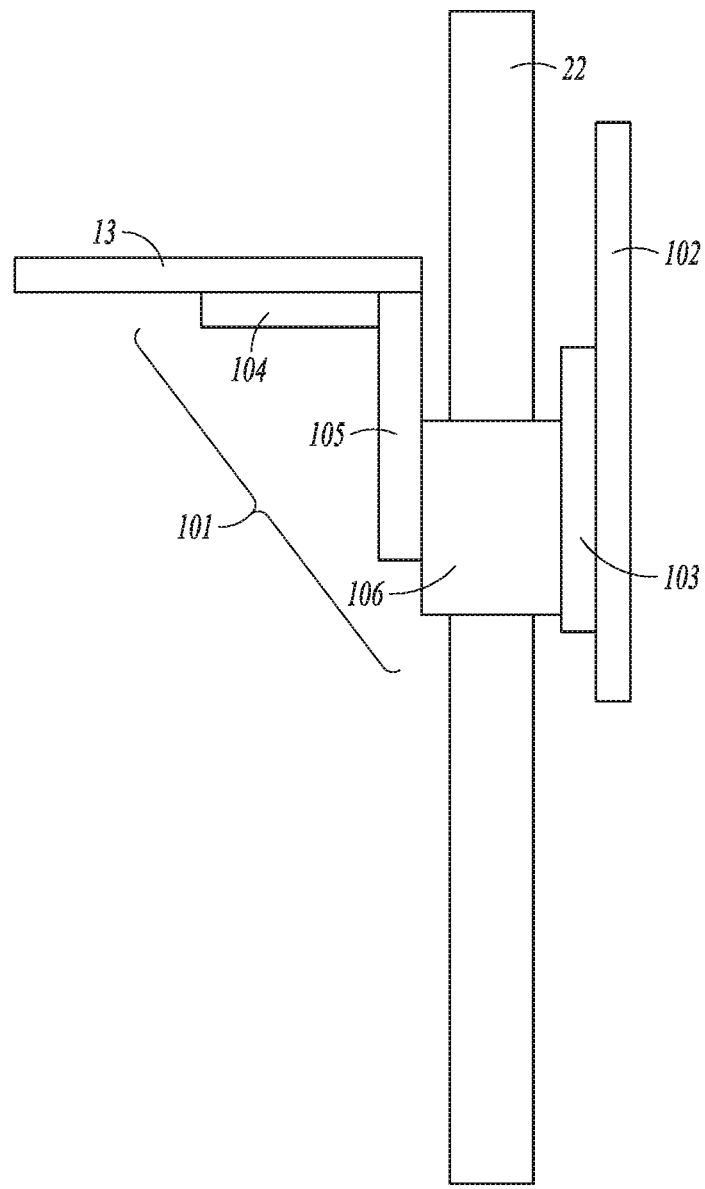
FIG. 23B illustrates a side view of the workstation assembly of FIG. 23A having a privacy panel that can move together with a height adjustable worksurface and can also include an independent height adjustment for the privacy panel, in accordance with at least one example of the present disclosure.

FIG. 23A illustrates a workstation assembly having a privacy panel that can move together with a height adjustable worksurface and can also include an independent height adjustment for the privacy panel, in accordance with at least one example of the present disclosure. A workstation assembly 21 can include a dual mounting member 101 that can be configured to support the worksurface 13 and a privacy panel 102. The dual mounting member 101 can be coupled to a lift mechanism 22 so that the worksurface 13 and the privacy panel 102 can move upwardly and downwardly together (e.g. in concert). In an example, the privacy panel 102 can include an independent height adjustment mechanism 103 (see FIG. 23B). The independent height adjustment mechanism 103 can be counterbalanced or manual. As shown in FIG. 23, the dual mounting member 101 can encircle a column that can include the lift mechanism 22 so that movement of the worksurface 13 and the privacy panel 102 can be tied together. The privacy panel 102 can include an independent lift mechanism 103 for fine tuning adjustments of the privacy panel 102 relative to the worksurface 13.

FIG. 23B illustrates a side view of the workstation assembly of FIG. 23A having a privacy panel that can move together with a height adjustable worksurface and can also include an independent height adjustment for the privacy panel, in accordance with at least one example of the present disclosure. The mounting member 101 can include a collar member 106 that can slide on the outside of the lift mechanism 22. The collar member 106 can be coupled to a vertical member 105 and a horizontal member 104 which can support the worksurface 13. The mounting member 101 can be coupled to the lift mechanism 22, by one or all of the collar member 106, the vertical member 105, or the horizontal member 104. The collar member can also be coupled to the privacy screen 102 directly or through the independent lift mechanism 103. As described above, the privacy screen 102 and the worksurface can move together as the mounting member 101 moves up and down. The independent lift mechanism 103 can allow adjustments of the height of the privacy screen relative to the worksurface 13.

In FIGS. 1-23 various lift mechanisms are coupled to one or both of a base or a panel. The base or panel can be described as a "supporting member". In an example, the supporting member can include vertical structural members and/or horizontal structural members as well as one or more planar members. The "panels" as described above in FIGS. can include planar "wall-like" panel members that can include one or more lift mechanism sandwiched between two planar members. The planar members can be attached to vertical and/or horizontal structural members. In an example, the lift mechanism can be coupled to any or all of the vertical structural members, the horizontal structural members or the planar members.

Various Notes & Examples

The above detailed description includes references to the accompanying drawings, which form a part of the detailed description. The drawings show, by way of illustration, specific examples in which the invention can be practiced. These examples are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other examples can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed example. Thus, the following claims are hereby incorporated into the Detailed Description as examples or examples, with each claim standing on its own as a separate example, and it is contemplated that such examples can be combined with each other in various combinations or permutations. The scope of the invention should be determined with reference to the appended claims, along with the full scope of equivalents to which such claims are entitled.

In this document, the terms "a" or are used to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In this document, the terms "about" and "approximately" are used to refer to an amount that is nearly, almost, or in the vicinity of being equal to a stated amount.

What is claimed is:

1. A workstation assembly comprising:
   a vertical panel having a top and a bottom; and
   at least one height adjustable device secured to the vertical panel, the at least one height adjustable device including:
     a worksurface configured to be affixed adjacent to a front portion of the vertical panel;
     a mounting member to be coupled to the worksurface; and
     a counterbalance mechanism configured to couple to the vertical panel and to the mounting member, the counterbalance mechanism configured to support the worksurface through a first range of travel; and
     a mounting member configured to couple the worksurface to the counterbalance mechanism; and
     at least one height adjustable privacy panel at least partially positioned within the vertical panel and configured to be raised and lowered through a second range of travel, the at least one height adjustable privacy panel configured to block at least one of sound, light, or vision.

2. The workstation assembly of claim 1, comprising:
   at least one power outlet coupled to the top of the vertical panel.

3. The workstation assembly of claim 2, wherein the vertical panel includes first and second side portions configured to extend above the top of the vertical panel, wherein the vertical panel and the first side portion defines a first channel, and wherein the vertical panel and the second side portion defines a second channel.

4. The workstation assembly of claim 3, wherein the first and second channels are sized and shaped to receive cables.

5. The workstation assembly of claim 1, wherein the at least one height adjustable privacy panel is adjustable independently of the worksurface.

6. The workstation assembly of claim 5, wherein the at least one height adjustable privacy panel includes a plurality of height adjustable privacy panels, and wherein each of the height adjustable privacy panels is associated with a corresponding mechanism separate from the counterbalance mechanism associated with the worksurface.

7. The workstation assembly of claim 6, wherein the corresponding mechanism separate from the counterbalance mechanism associated with the worksurface includes a counterbalance mechanism.

8. The workstation assembly of claim 1, wherein a height of the at least one height adjustable privacy panel is adjustable independently of a height of the worksurface.

9. The workstation assembly of claim 1, wherein the mounting member includes a collar member configured to be coupled to a vertical member.

10. The workstation assembly of claim 9, wherein the at least one height adjustable privacy panel is configured to be coupled to the collar member such that the at least one height adjustable privacy panel is configured to move together with the worksurface of at least one of the plurality of height adjustable devices.

11. The workstation assembly of claim 10, comprising:
    a lift mechanism coupled to the collar member and the at least one height adjustable privacy panel, wherein the lift mechanism is configured to allow independent adjustment of a height of the at least one height adjustable privacy panel relative to the work surface.

12. The workstation assembly of claim 1, wherein the first range of travel includes a first position in which the counterbalance mechanism positions the worksurface above the bottom of the vertical panel and a second position in which the counterbalance mechanism positions the worksurface below the top of the vertical panel.

13. A workstation assembly comprising:
    a vertical panel having a top and a bottom; and
    a height adjustable device secured to the vertical panel, the height adjustable device including:
      a worksurface configured to be affixed adjacent to a front portion of the vertical panel;
      a mounting member to be coupled to the worksurface; and
      a first counterbalance mechanism configured to couple to the vertical panel and to the mounting member, the first counterbalance mechanism configured to support the worksurface through a first range of travel; and
      a mounting member configured to couple the worksurface to the first counterbalance mechanism;
      a height adjustable privacy panel at least partially positioned within the vertical panel and configured to block at least one of sound, light, or vision; and
      a second counterbalance mechanism configured to support the height adjustable privacy panel through a second range of travel.

14. The workstation assembly of claim 13, comprising:
    at least one power outlet coupled to the top of the vertical panel.

15. The workstation assembly of claim 14, wherein the vertical panel includes first and second side portions configured to extend above the top of the vertical panel, wherein the vertical panel and the first side portion defines a first channel, and wherein the vertical panel and the second side portion defines a second channel.

16. The workstation assembly of claim 15, wherein the first and second channels are sized and shaped to receive cables.

17. A workstation assembly composing:
    a vertical panel having a top and a bottom; and
    a height adjustable device secured to the vertical panel, the height adjustable device including:
      a worksurface configured to be affixed adjacent to a front portion of the vertical panel;
      a mounting member to be coupled to the worksurface; and
      a counterbalance mechanism configured to couple to the vertical panel and to the mounting member, the counterbalance mechanism configured to support the worksurface through a first range of travel; and
      a mounting member configured to couple the worksurface to the counterbalance mechanism;
      a height adjustable privacy panel at least partially positioned within the vertical panel and configured to block at least one of sound, light, or vision; and a height adjustment mechanism configured to support the height adjustable privacy panel through a second range of travel.

18. The workstation assembly of claim 17, comprising:
at least one power outlet coupled to the top of the vertical panel.

19. The workstation assembly of claim 18, wherein the vertical panel includes first and second side portions configured to extend above the top of the vertical panel, wherein the vertical panel and the first side portion defines a first channel, and wherein the vertical panel and the second side portion defines a second channel.

20. The workstation assembly of claim 19, wherein the first and second channels are sized and shaped to receive cables.

* * * * *

UNITED STATES PATENT AND TRADEMARK OFFICE
CERTIFICATE OF CORRECTION

PATENT NO. : 10,939,750 B2
APPLICATION NO. : 16/737456
DATED : March 9, 2021
INVENTOR(S) : Swartz et al.

Page 1 of 2

It is certified that error appears in the above-identified patent and that said Letters Patent is hereby corrected as shown below:

On the Title Page

Item (56) on page 2, in Column 1, under "Foreign Patent Documents", Line 6, delete "TW M486238 U" and insert --TW M486237 U-- therefor In the Specification In Column 2, Line 41, after "mechanism.", insert a linebreak In Column 5, Line 32, delete "work surface." and insert --worksurface.-- therefor In Column 5, Line 54, delete "matter it" and insert --matter-it-- therefor In Column 8, Line 21, delete "15A, 15A," and insert --15A, 15B,-- therefor In Column 8, Lines 49-50, delete "FIG. 3)," and insert --FIG. 3).-- therefor In Column 10, Lines 52-53, delete "work surface" and insert --worksurface-- therefor In Column 11, Line 9, delete "FIG." and insert --FIGS.-- therefor In Column 11, Line 9, delete "7-B" and insert --7A-B-- therefor In Column 11, Line 47, delete "43C and 43C" and insert --43C and 43D-- therefor In Column 16, Line 28, before "still", insert --is--

In Column 17, Line 5, before "are", insert --"an"--

In Column 17, Line 7, delete "in" and insert --In-- therefor

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,939,750 B2

In the Claims

In Column 18, Line 10, in Claim 11, delete "work surface." and insert --worksurface.-- therefor In Column 18, Line 51, in Claim 17, delete "composing:" and insert --comprising:-- therefor